(12) United States Patent  (10) Patent No.: US 8,095,018 B2
Sekine et al.  (45) Date of Patent: Jan. 10, 2012

(54) QUATERNARY PHASE MODULATOR

(75) Inventors: Kenro Sekine, Fuchu (JP); Nobuhiko Kikuchi, Tokyo (JP); Shinya Sasaki, Koganei (JP)

(73) Assignee: Hitachi, Ltd., Tokyo (JP)

( * ) Notice: Subject to any disclaimer, the term of this patent is extended or adjusted under 35 U.S.C. 154(b) by 619 days.

(21) Appl. No.: 12/222,574

(22) Filed: Aug. 12, 2008

(65) Prior Publication Data

US 2009/0092401 A1  Apr. 9, 2009

(30) Foreign Application Priority Data

Sep. 27, 2007  (JP) .................................. 2007-250368

(51) Int. Cl.
H04B 10/00 (2006.01)
H04B 10/04 (2006.01)
H04J 14/00 (2006.01)

(52) U.S. Cl. .......... 398/198; 398/93; 398/157; 398/158; 398/188; 398/193; 398/194

(58) Field of Classification Search .................... 398/82, 398/91–93, 154, 155, 157, 158, 183, 185, 398/188, 193, 197, 198
See application file for complete search history.

(56) References Cited

U.S. PATENT DOCUMENTS

| 7,266,306 | B1 | 9/2007 | Harley et al. |
| 2004/0081470 | A1 | 4/2004 | Griffin |
| 2006/0285787 | A1* | 12/2006 | Sakane et al. .................. 385/3 |
| 2007/0177882 | A1* | 8/2007 | Akiyama ..................... 398/185 |

FOREIGN PATENT DOCUMENTS

JP  2004-516743  12/2001

OTHER PUBLICATIONS

Sekine et al., "A Novel Bias Control Technique for MZ Modulator with Monitoring Power of Backward Light for Advanced Modulation Formats", Optical Society of America, 2007, OSA 1-55752-830-6, 3 pages.

* cited by examiner

*Primary Examiner* — M. R. Sedighian
(74) *Attorney, Agent, or Firm* — Crowell & Moring LLP

(57) ABSTRACT

In a quaternary phase modulator including two phase modulators disposed in parallel and a phase adjuster that adjusts a phase difference when the outputs of the two phase modulators are combined, there are provided a second light source that introduces light propagated in a backward direction, a first controller that controls the bias of the two phase modulators so that the intensity of the backward light is a minimum on the input side of the quaternary phase modulator, and a second controller that controls the bias of the phase adjuster so that a result monitored by a photodiode having a bandwidth not exceeding the bit rate on the output side of the quaternary phase modulator is a minimum, the first controller being implemented after the second controller is implemented.

10 Claims, 24 Drawing Sheets

FIG. 18
*WHEN BIAS 2 IS AN OPTIMUM VALUE (WHEN IT IS ORTHOGONAL)
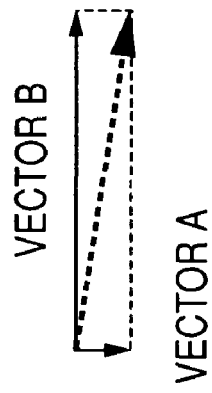
(C) CASE 3
(B) CASE 2
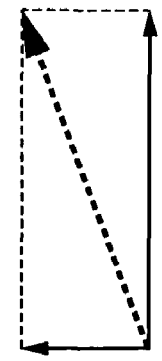
(A) CASE 1

*WHEN BIAS 2 HAS SHIFTED FROM AN OPTIMUM VALUE (WHEN ORTHOGONALITY HAS DETERIORATED)

(A) CASE 1

(B) CASE 2

(C) CASE 3

QUATERNARY PHASE MODULATOR

CLAIM OF PRIORITY

The present application claims priority from Japanese patent application JP 2007-250368 filed on Sep. 27, 2007, the content of which is hereby incorporated by reference into this application.

FIELD OF THE INVENTION

The present invention relates to a technique for stabilizing control of a phase modulator, and in particular, to a quaternary phase modulator which modulates the phase of a light on four levels.

BACKGROUND OF THE INVENTION

In recent years, there has been a rapid progression to the use of optical fiber access networks, and video distribution services using these mass access networks are steadily gaining popularity. Due to the increase in demand for high-capacity-data communication in both hardware and software, the demand for higher bit rates in optic fiber communication is increasing.

However, various problems have surfaced in attempts to increase the bit rate of optic fiber communications. Firstly, along with an improvement in the bit rate of optic fiber communications, it is necessary to increase the operating speed of the electrical devices and optical devices used in transceivers. At present, in the IM-DD method (Intensity Modulation-Direct Detection) which is mainly used for optic fiber communications, there is a simple technique wherein, in the transmitter, "0", "1" of an electrical signal are replaced by OFF, ON of a light, and in the receiver, "0", "1" of the electrical signal is then reproduced again. Therefore, if it is attempted to improve 10 Gbps which is the current norm to 40 Gbps, it is necessary to increase the operating speed of optical devices such as lasers and photodiodes, or electrical devices such as electrical amplifiers which drive them as well as their discrimination circuits, by 4 times. In addition to the technical problems involved in operating electrical and optical devices at 40 Gbps, there is also the problem of a high material and manufacturing cost.

When bit rates used in optic fiber communications are increased, the light waveform will deteriorate due to the chromatic dispersion in the optical fiber, and the transmission rate and transmission distance will thereby be limited. Chromatic dispersion (hereafter, distribution) is the wavelength dependency of the group velocity with which a signal spreads in an optical fiber.

Strictly speaking, a light waveform has plural wavelength components (i.e., spectral broadening), and if the group velocity has wavelength dependency, there will be a component which propagates slowly and a component which propagates rapidly in the optical fiber, and as a result, the waveform will broaden. Hence, if the amount of dispersion cannot be ignored, waveform distortion will occur and receiving characteristics will deteriorate.

Since the amount of dispersion is proportional to the length of the fiber, the result is that the transmission distance is limited. The transmission distance of a chromatic dispersion limit is in inverse proportion to the square of the transmission bandwidth. For example, if it is attempted to convert a signal propagating at 10 Gbps to 40 Gbps, the distance will be reduced to $1/16$.

When bit rates used in optic fiber communication are increased, the light waveform will deteriorate due also to the polarization dispersion in the optical fiber, and this also limits the transmission rate and transmission distance.

Regarding polarization dispersion, due to physical stress, or environmental factors such as temperature and humidity, the perfect circularity of cross-section with which the optical fiber was designed will deteriorate slightly, and this will lead to propagation in two modes even in a single mode fiber.

Since the propagation speed differs slightly between modes, waveform broadening will again occur and distance will be limited. The transmission distance at the polarization dispersion limit is in inverse proportion to the transmission bandwidth, and as in the previous example, if it is attempted to convert a signal propagating at 10 Gbps to 40 Gbps, the distance will be reduced to $1/4$.

The increase of bit rate also brings about an increase in signal bandwidth occupancy. For example, it is attempted to increase the bit rate by 4 times, the signal bandwidth occupancy, i.e., the spectral bandwidth of the occupying signal, is also increased by 4 times. If it is attempted to convert an optical signal to multi-channel in the wavelength direction such as in wavelength multiplexed transmission (WDM), the bandwidth is then limited by the amplification bandwidth of the optical amplifier which performs package amplification of this wavelength multiplexing signal. Specifically, if it is desired to set wavelengths so that wavelength multiplexing signals do not overlap, the product of the occupied spectral bandwidth and the wavelength number must necessarily be the amplification bandwidth of this optical amplifier. Since the amplification bandwidth is constant and it is necessary to decrease the wavelength number if the occupied spectral bandwidth is increased, even if the bit rate is improved, the spectral bandwidth will increase by a corresponding amount and the wavelength number will decrease, so the total capacity does not change and conversion to high capacity will thus be limited.

Optical multi-level modulation is now attracting attention as a way of overcoming the limitations of device response speed, the limitations due to chromatic dispersion and polarization, and the limitations due to broadening of spectral bandwidth. Optical multi-level modulation is a technique whereby, by performing M (M>2) modulations of light intensity, optical phase, or both, the total transmission capacity is increased by log M times (the base of the logarithm is 2), without increasing the bit rate of the modulation drive signal.

Specifically, consider the case where it is desired to form a 40 Gbps signal. With conventional binary transmission, a drive signal of 40 Gbps is required.

In quaternary transmission, on the other hand, the transmission capacity can be increased by log 4=2 times, hence by providing two driving signals of 20 Gbps, 40 Gbps can be achieved. Likewise, in octal transmission, the transmission capacity can be increased by 3 times by providing three signals of approximately 13 Gbps. In 16 value (hexadecimal) transmission, the transmission capacity can be increased by 4 times by providing four signals of 10 Gbps. In both of these cases, therefore, 40 Gbps transmission can be realized.

In transmission using such an optical multi-level modulation signal, the chromatic dispersion, polarization dispersion and occupied spectral bandwidth are limited by the rate of these driving signals, so in the case of a 40 Gbps signal formed by two 20 Gbps signals mentioned hereinabove, as compared to transmitting the 40 GB/s signal by binary transmission according to the prior art, the chromatic dispersion limiting distance can be extended by 4 times, the polarization dispersion limiting distance can be extended by 2 times, and the occupied spectral bandwidth can be reduced to ½.

In optical multi-level modulation, QPSK (Quaternary Phase Shift Keying) wherein the phase of the light is modulated by 4 values, is attracting attention due to the ease of uniformly controlling the gaps between each level, and the improvement of sensitivity due to phase modulation.

As a method of forming a quaternary phase modulation signal, the technique disclosed in JP-T-2004-516743 is often used. The principle will be described using FIG. 1. A signal light outputted from a light source (1) is split in a branching filter (2). The signal light split into two parts reaches phase modulators A and B (3A, 3B), respectively. An electrical signal wherein a bias voltage 1A (6A) is superposed on a data signal A (7A) by a bias superposer (8A), is applied to the phase modulator A. The lightwave signal inputted into the phase modulator A (3A) is subjected to binary phase modulation by this electrical signal, and the result is outputted.

This situation will be described using FIG. 2 and FIG. 3. A Mach-Zehnder (MZ) type interferometer is generally used for the phase modulator. The output characteristic (extinction characteristic) of the MZ modulator is shown in FIG. 2. When the applied voltage (horizontal axis) of the MZ modulator is varied, the output (vertical axis) from the modulator traces a locus which resembles a sinusoidal wave as shown in FIG. 2. The voltage required for the extinction to change from a valley to a peak is a key parameter which is defined as $V\pi$, and represents the characteristic of the modulator.

As shown in FIG. 3, here, the case will be considered where a binary electrical waveform of amplitude $2V\pi$ centered on the valley of the extinction characteristic (wherein the bias voltage is made to coincide with the valley of the extinction characteristic), is applied to this modulator. Since modulation is performed from peak to peak of the extinction characteristic, the output of the modulator is a waveform which first changes from a peak to a valley, and then becomes a peak again. Specifically, at the center of a bit, the output is always at the position of a peak and the amplitude is fixed. However, regarding the phase of the light, care is required. At adjacent peaks of the extinction characteristic of a MZ modulator, the phases of the outputted light differ by $\pi$. Specifically, when these characteristics are taken into consideration, "0" of the input electrical waveform is converted to an output light of amplitude "1", phase "0", and "1" of the input electrical waveform is converted to an output light of amplitude "1", phase "$\pi$". Specifically, a binary-phase-modulation signal having a fixed amplitude and a phase of "0", "$\pi$" is formed.

FIG. 4 shows the phase states at a point A in FIG. 1, i.e., in the output of the phase modulator A (3A). The graphs of FIG. 4 are diagrams which represent the phase in a complex plane using the I-axis and the Q-axis. The I-axis represents the amount of an in-phase component, and the Q-axis represents the amount of a quadrature component. When arbitrary signal points are disposed on the coordinate axes, the distance of the signal point from the origin represents the amplitude of the signal. The angle between a line which connects the signal point from the origin, and a line which connects the positive direction of the I-axis from the origin, represents the phase of the signal. Thus, for the phase states at the point A, two points are disposed on the I-axis symmetrically around the origin. Specifically, data signals of amplitudes "0", "1" are changed into two points of phase "0" and phase "$\pi$", respectively.

Likewise, an electrical signal wherein a bias voltage 1B (6B) is superposed on a data signal B (7B) by a bias superposer (8B), is applied to the phase modulator B. The lightwave signal inputted into the phase modulator B (3B) is subjected to binary phase modulation by this electrical signal, and the result is outputted. Thus, a point B in FIG. 1, i.e., the phase state in the output of the phase modulator B (3B), is disposed at two points on the I-axis symmetrical about the origin as in the case of the point A, as shown in FIG. 4. Specifically, data signals of amplitude "0", "1" are changed into two points of phase "0" and phase "$\pi$", respectively.

The phase adjuster (4) is installed in the output of the phase modulator B (3B), which is one of the two phase modulators. A bias voltage 2 is applied to the phase adjuster (4). The phase of the lightwave signal inputted into the phase adjuster (4) is adjusted by an amount according to this bias voltage 2, and is outputted. As this phase adjustment, $\pi/2$ is an ideal value. As a result of this phase adjustment by $\pi/2$, the phase states at a point C and a point D give mutually different results, as shown in FIG. 4. Specifically, the phase state at the point D, as a result of rotating each signal point by $\pi/2$, shifts to two points disposed on the Q-axis disposed symmetrically about the origin.

The output of the phase modulator A (3A), and the output of the phase adjuster (4), are multiplexed by the multiplexer (5). The output of the multiplexer (5), i.e., the phase state of the signal points at a point E, is shown in FIG. 4. These signal points correspond to four points shown by small circles with dotted lines in the diagram before multiplexing, and as a result of multiplexing by the multiplexer (5), four signal points are output which are a combined electric field, or geometrically, a combined vector, of these four points. Specifically, "x, y" show the state of data A, and the state of data B, respectively, and the signal point when the data A is "0" and the data B is "1", i.e., "0, 1", is disposed at a point in the fourth quadrant of the coordinates.

Likewise, the points "0, 0", "1, 0", and "1, 1" are disposed in the first, second, and third quadrants, respectively. Hence, a quaternary phase modulation signal having the four phase levels $+\pi/4$, $+3\pi/4$, $-3\pi/4$ and $-\pi/4$, is formed.

SUMMARY OF THE INVENTION

The quaternary phase modulation waveform as shown in FIG. 4, assumes that the bias voltage 1A (6A) of the phase modulator A (3A) and the bias voltage 1B (6B) of the phase modulator B (3B) both coincide with the valley of the extinction characteristic of the phase modulator, and that the bias voltage 2(9) of the phase adjuster (4) is equivalent to a phase shift of $\pi/2$.

However, it is well-known that the extinction characteristic of the phase modulator (3A, 3B) or the phase shift characteristic of the phase adjuster (4) fluctuate with time according to environmental temperature changes, thermal changes accompanying absorption of the inputted electrical signal, and the electrification effect at the electrodes of the electrical signal. In general, this is referred to as a bias drift phenomenon. The case will now be considered where this bias drift occurs, and it is impossible to maintain the above assumptions.

For example, the case is considered where a bias drift occurs in the phase modulator A (3A), and the valley and bias voltage 1A (6A) of the phase modulator do not coincide. In this case, as shown in FIG. 5, the center (bias) of the electrical waveform is offset from the valley of the extinction characteristic. Considering the case where the data changes to "1" from "0", the output reaches the peak of the extinction characteristic, but continues increasing even after reaching maximum output, and settles down to the middle of the peak. As a result, the amplitude of the output waveform will decrease.

If this is expressed in complex coordinates, the result will be as shown in FIG. 6. Specifically, although the phase state at the point A is still on the I-axis symmetrical about the origin, the distance from the starting point, i.e., the amplitude, will decrease. As a result, the modulator output, i.e., the phase state at the point E, is characterized by a condensation in the I axis direction.

Therefore, the intervals between the four phase levels which should be equal, are unequal, and the sensitivity will vary for each level.

The case is also considered when there is a bias drift in the phase adjuster (4), and the phase shift is less than $\pi/2$. In this case, as shown by the characteristics at the point D in FIG. 7, as a result of the phase shift being less than $\pi/2$, the modulator output, i.e., the phase state at the point E which was previously square, changes to a lozenge shape. Specifically, the amplitude in the states "1, 0", and "0, 1" will decrease, and the receiving sensitivity in the states "1, 0", "0, 1" will deteriorate.

Thus, when a bias drift occurred and the bias voltages 1A, 1B (6A, 6B) of the phase modulators A, B (3A, 3B) were offset from the valley of the extinction characteristic, or when the phase shift of the phase adjuster (4) was offset from $\pi/2$, there was a problem of scatter in the receiving sensitivity, and overall deterioration of receiving sensitivity.

The ideal bias voltage at which the extinction characteristic of the phase modulators A, B is a valley, or the ideal bias voltage at which the phase shift of the phase adjuster (4) is $\pi/2$, is a different value for each device, so there was a problem that if a separate adjustment was not made for each device, it led to a deterioration of receiving sensitivity.

Moreover, when the phase modulator was started up, it is necessary to perform control from the initial state (in many cases, zero voltage, or a certain default value memorized by the device) to an ideal bias voltage at which the extinction characteristic of the phase modulators A, B is a valley, or to perform control to the ideal bias voltage at which the phase shift of the phase adjuster (4) is $\pi/2$, and if such a control mechanism was not provided, there was a problem that this would also cause a deterioration of receiving sensitivity.

According to a first aspect of the present invention, to solve the above problems, therefore a quaternary phase modulator includes: an optical branching filter which splits light output from a first light source into two parts; two phase modulators respectively disposed in the two outputs of the splitter, which respectively modulate the phases of the two lights, and output the resulting light; one phase adjuster disposed in one of the outputs of the phase modulators, which shifts the phase of the light and outputs the resulting light; an optical multiplexer which multiplexes the output light of the phase adjuster and the output light of the phase modulator on the side where the phase adjuster is not installed; and a second light source for a backward light which propagates in the opposite direction to that of the light output from the first light source in the quaternary phase modulator; and an optical coupler provided in the output of the optical multiplexer to introduce this second light source into the multi-level phase modulator, in which the quaternary phase modulator includes a first controller which feedback controls the bias voltage of the modulating electrical signal applied to the two phase modulators so that the optical intensity monitor result of the backward light on the input side of the quaternary phase modulator, i.e., on the input side of the optical branching filter, is a minimum value, or does not exceed a specified value; and further includes a second controller which feedback controls the voltage applied to the phase adjuster so that the result of monitoring the output side of the quaternary phase modulator, i.e., the output light of the optical multiplexer, by a photodiode having frequency response characteristics not exceeding the bit rate, is a minimum value, or does not exceed a specified value, in which the first controller is preferentially implemented after the second controller.

According to a second aspect of the present invention, to solve the above problems, a quaternary phase modulator, includes: an optical branching filter which splits light output from a first light source into two parts; two phase modulators respectively disposed in the two outputs of the modulators which respectively modulate the phases of the two lights, and output the resulting lights; one phase adjuster disposed in one of the outputs of the phase modulators, which shifts the phase of the light and outputs the resulting light; an optical multiplexer which multiplexes the output light of the phase adjuster and the output light of the phase modulator on the side where the phase adjuster is not installed, and outputs the resulting light; a second light source for a backward light which propagates in the opposite direction to that of the light output from the first light source in the quaternary phase modulator; and an optical coupler provided in the output of the optical multiplexer to introduce this second light source into the multi-level phase modulator, and the quaternary phase modulator includes a first controller which feedback controls the bias voltage of the modulating electrical signal applied to the two phase modulators so that the optical intensity monitor result of the backward light on the input side of the quaternary phase modulator, i.e., on the input side of the optical branching filter, is a minimum value, or does not exceed a specified value; and further includes a second controller which feedback controls the voltage applied to the phase adjuster so that the result of monitoring the output side of the quaternary phase modulator, i.e., the output light of the optical multiplexer, by a photodiode having frequency response characteristics not exceeding the bit rate, is a minimum value, or does not exceed a specified value, in which a control time constant of the second controller is a value smaller than a control time constant of the first controller.

According to a third aspect of the present invention, to solve the above problems, a quaternary phase modulator includes: an optical branching filter which splits light output from a first light source into two parts; two phase modulators respectively disposed in the two outputs of the modulators which respectively modulate the phases of the two lights, and output the resulting lights; one phase adjuster disposed in one of the outputs of the phase modulators, which shifts the phase of the light and outputs the resulting light; an optical multiplexer which multiplexes the output light of the phase adjuster and the output light of the phase modulator on the side where the phase adjuster is not installed, and outputs the resulting light; a second light source for a backward light which propagates in the opposite direction to that of the light output from the first light source in the quaternary phase modulator; and an optical coupler provided in the output of the optical multiplexer to introduce this second light source into the multi-level phase modulator; and the quaternary phase modulator includes a first controller which feedback controls the bias voltage of the modulating electrical signal applied to the two phase modulators so that the optical intensity monitor result of the backward light on the input side of the quaternary phase modulator, i.e., on the input side of the optical branching filter, is a minimum value, or does not exceed a specified value; and further includes a second controller which, when two low frequency signals which may be different or identical are respectively superposed on the modulating electrical signals applied to the phase adjuster, and the output light of the quaternary phase modulator, i.e. the output light of the optical multiplexer, is photoelectrically converted and filtered at the frequency of the sum or difference of the two low frequency signals, feedback controls the voltage applied to the phase adjuster so that the absolute value of the filtered light is a minimum value, or does not exceed a specified value; in which the first controller is preferentially implemented after the second controller.

According to a fourth aspect of the present invention, to solve the above problems, a quaternary phase modulator includes: an optical branching filter which splits light output from a first light source into two parts; two phase modulators respectively disposed in the two outputs of the modulators which respectively modulate the phases of the two lights, and output the resulting lights; one phase adjuster disposed in one of the outputs of the phase modulators, which shifts the phase of the light and outputs the resulting light; an optical multiplexer which multiplexes the output light of the phase adjuster and the output light of the phase modulator on the side where the phase adjuster is not installed, and outputs the resulting light; a second light source for a backward light which propagates in the opposite direction to that of the light output from the first light source in the quaternary phase modulator; and an optical coupler provided in the output of the optical multiplexer to introduce this second light source into the multi-level phase modulator; and the quaternary phase modulator includes a first controller which feedback controls the bias voltage of the modulating electrical signal applied to the two phase modulators so that the optical intensity monitor result of the backward light on the input side of the quaternary phase modulator, i.e., on the input side of the optical branching filter, is a minimum value, or does not exceed a specified value; and further includes a second controller which, when two low frequency signals which may be different or identical are respectively superposed on the modulating electrical signals applied to the two phase modulators, and the output light of the quaternary phase modulator, i.e., the output light of the optical multiplexer, is photoelectrically converted and filtered at the frequency of the sum or difference of the two low frequency signals, feedback controls the voltage applied to the phase adjuster so that the absolute value of the filtered light is a minimum value, or does not exceed a specified value; in which a control time constant of the second controller is a smaller value than a control time constant of the first controller.

According to a fifth aspect of the present invention, to solve the above problems, a quaternary phase modulator includes: an optical branching filter which splits light output from a first light source into two parts; two phase modulators respectively disposed in the two outputs of the modulators which respectively modulate the phases of the two lights, and output the resulting lights; one phase adjuster disposed in one of the outputs of the phase modulators, which shifts the phase of the light and outputs the resulting light; an optical multiplexer which multiplexes the output light of the phase adjuster and the output light of the phase modulator on the side where the phase adjuster is not installed, and outputs the resulting light; a second light source for a backward light which propagates in the opposite direction to that of the light output from the first light source in the quaternary phase modulator; and an optical coupler provided in the output of the optical multiplexer to introduce this second light source into the multi-level phase modulator; and the quaternary phase modulator includes a first controller which feedback controls the bias voltage of the modulating electrical signal applied to the two phase modulators so that the optical intensity monitor result of the backward light on the input side of the quaternary phase modulator, i.e., on the input side of the optical branching filter, is a minimum value, or does not exceed a specified value; and further includes a second controller which, when two low frequency signals which may be different or identical are respectively superposed on the modulating electrical signals applied to the two phase modulators, and the backward light on the input side of the quaternary phase modulator, i.e. on the input side of the optical branching filter, is photoelectrically converted and filtered at the frequency of the sum or difference of the two low frequency signals, feedback controls the voltage applied to the phase adjuster so that the absolute value of the filtered light is a minimum value, or does not exceed a specified value; in which the first controller is preferentially implemented after the second controller.

According to a sixth aspect of the present invention, to solve the above problems, a quaternary phase modulator includes: an optical branching filter which splits light output from a first light source into two parts; two phase modulators respectively disposed in the two outputs of the modulators which respectively modulate the phases of the two lights, and output the resulting lights; one phase adjuster disposed in one of the outputs of the phase modulators, which shifts the phase of the light and outputs the resulting light; an optical multiplexer which multiplexes the output light of the phase adjuster and the output light of the phase modulator on the side where the phase adjuster is not installed, and outputs the resulting light; a second light source for a backward light which propagates in the opposite direction to that of the light output from the first light source in the quaternary phase modulator; and an optical coupler provided in the output of the optical multiplexer to introduce this second light source into the multi-level phase modulator; and the quaternary phase modulator includes a first controller which feedback controls the bias voltage of the modulating electrical signal applied to the two phase modulators so that the optical intensity monitor result of the backward light on the input side of the quaternary phase modulator, i.e., on the input side of the optical branching filter, is a minimum value, or does not exceed a specified value; and further includes second controller which, when two low frequency signals which may be different or identical are respectively superposed on the modulating electrical signals applied to the two phase modulators, and the backward light on the input side of the quaternary phase modulator, i.e. on the input side of the optical branching filter, is photoelectrically converted and filtered at the frequency of the sum or difference of the two low frequency signals, feedback controls the voltage applied to the phase adjuster so that the absolute value of the filtered light is a minimum value, or does not exceed a specified value, in which a control time constant of the second controller is a smaller value than a control time constant of the first controller.

According to the first, third and fifth aspects of this invention, the bias voltage of the two phase modulators is stably controlled by the first controller, the bias voltage of the phase adjuster is stably controlled by the second controller, and by giving more priority to the second control than the first control, a more stable quaternary phase modulator can be realized.

According to an embodiment of the present invention, the quaternary phase modulator can also be started up more rapidly.

According to the second, fourth, and sixth aspects of this invention, the bias voltage of the two phase modulators is stably controlled by the first controller, the bias voltage of the phase adjuster is stably controlled by the second controller, and by making the second control time constant shorter than the first controlled time constant, a more stable quaternary phase modulator can be realized.

BRIEF DESCRIPTION OF THE DRAWINGS

FIG. 18 is a schematic diagram 1 describing the effect of the phase adjuster bias on the phase modulator bias;

DETAILED DESCRIPTION OF THE PREFERRED EMBODIMENTS

First Embodiment

Figure 1:
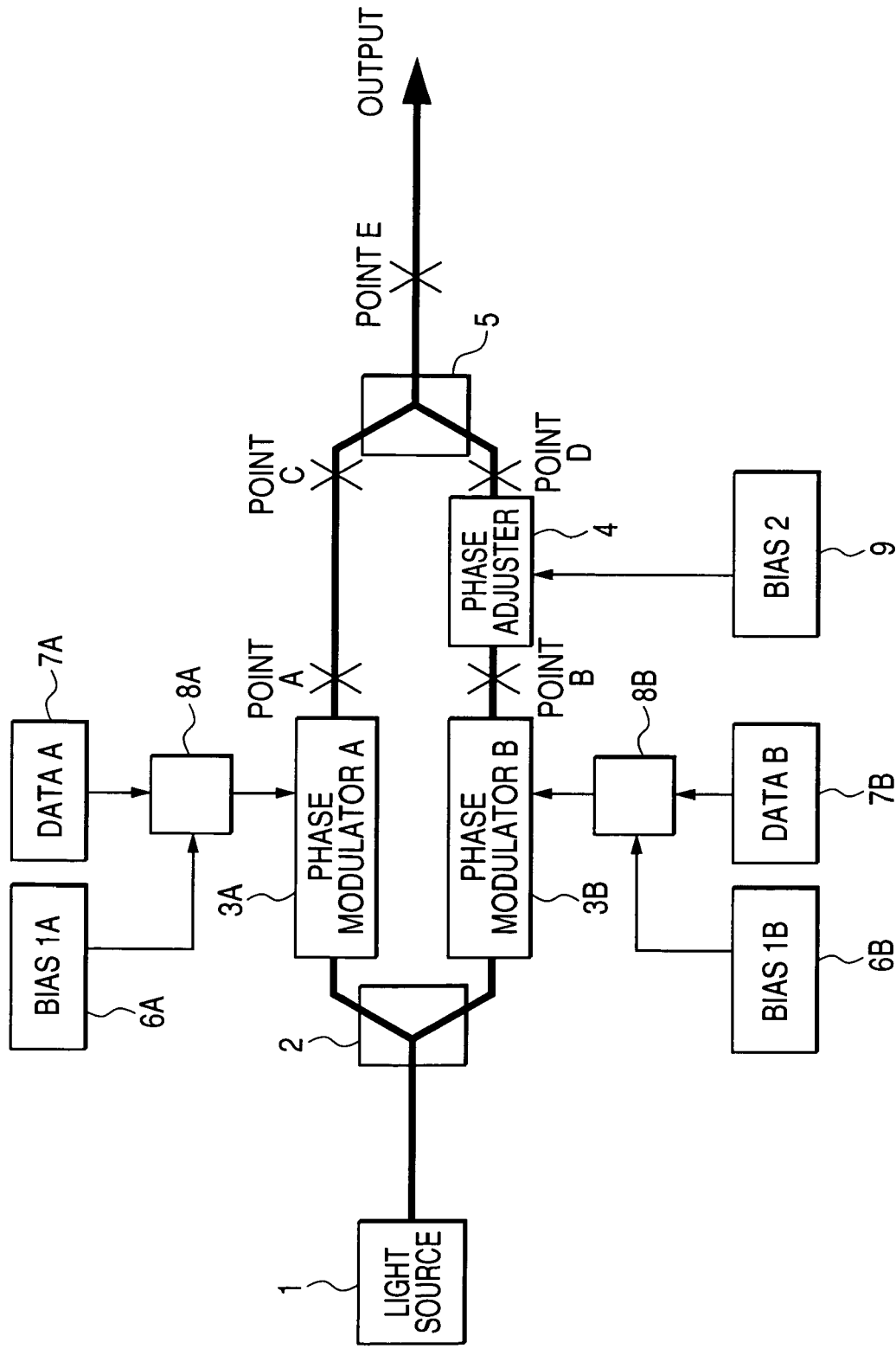
FIG. 1 shows the general construction of a quaternary phase modulator.
Figure 2:
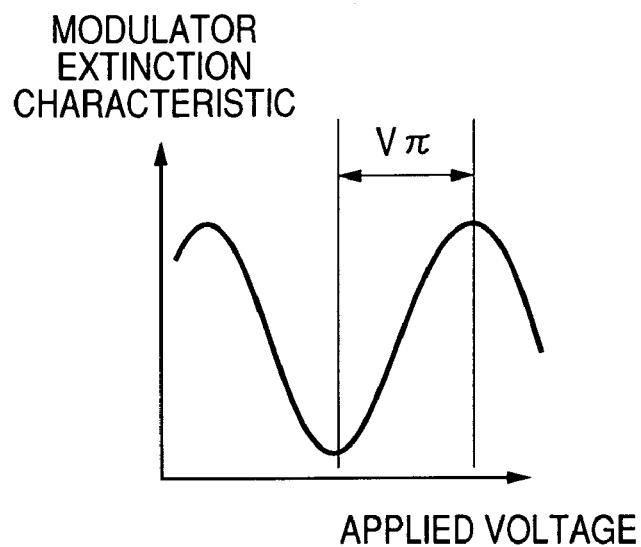
FIG. 2 shows an extinction characteristic of a MZ modulator.
Figure 3:
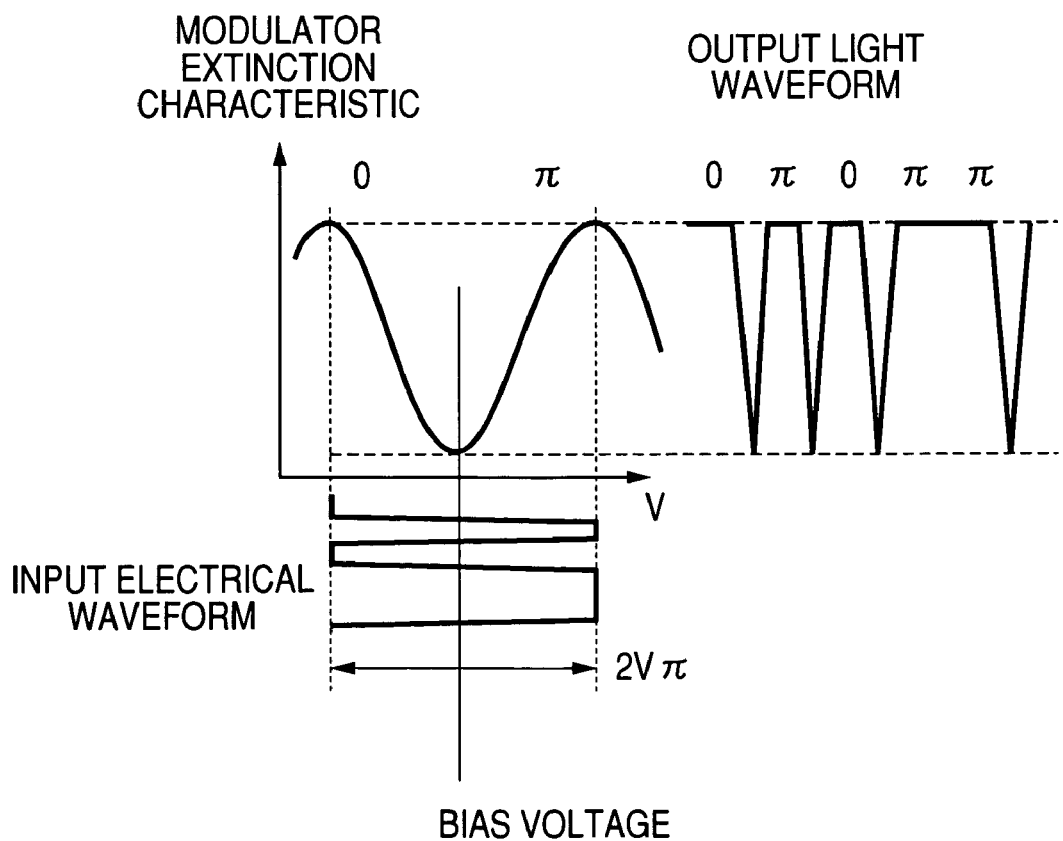
FIG. 3 shows an example of phase modulation in a MZ modulator.

A first embodiment of the present invention will now be described referring to FIG. 8 to FIG. 20.

A signal light outputted from the light source 1 (11) is split into two parts by the branching filter (14). Another branching filter (12) is installed between the light source 1 (11) and the branching filter (14), the light propagated in the opposite direction is spectrally separated by this branching filter (14), and the signal light outputted from the light source 1 (11) reaches the photodiode (13). The signal light split into two parts by the branching filter (14) reaches the phase modulators A, B (15A, 15B), respectively. An electrical signal wherein the bias voltage 1A (22A) is superposed on the data signal A (23A) by the bias superposer (24A), is applied to the phase modulator A (15). The lightwave signal inputted into the phase modulator A (15A) is subjected to binary phase modulation by this electrical signal, and the result is outputted.

Likewise, an electrical signal wherein the bias voltage 1B (22B) is superposed on the data signal B (23B) by the bias superposer (24B), is applied to the phase modulator B (15B). The lightwave signal inputted into the phase modulator B (15B) is subjected to binary phase modulation by this electrical signal, and the result is outputted.

The phase adjuster (16) is installed in the output of the phase modulator B (15B), which is one of the two phase modulators. The bias voltage 2 (26) is applied to the phase adjuster (16). The phase of the lightwave signal inputted into the phase adjuster (16) is adjusted by an amount according to this bias voltage 2 (26), and is outputted. As this phase adjustment, $\pi/2$ is an ideal value.

The output of the phase modulator A (15A), and the output of the phase adjuster (16), are multiplexed by the multiplexer (17). The output of the multiplexer (17) acts as a quaternary phase modulation signal having four phase levels, i.e., $+\pi/4$, $+3\pi/4$, $-3\pi/4$ and $-\pi/4$, when the bias of the phase modulator A (15A), phase modulator B (15B), and phase adjuster (16) is ideal.

The branching filter (18) which extracts part of the outputted light is installed in the output of the multiplexer (17), and the split optical signal reaches the photodiode (19). The photodiode (19) has a frequency response characteristic not exceeding the bit rate. The multiplexer (20) that multiplexes the signal light from the light source 2 (21) is further installed in the other output of the branching filter (18).

Note that the lightwave signal outputted from the light source 1 (11) propagates from the left to the right of the figure, i.e., it reaches the multiplexer (17) via the phase modulator A (15A) or phase modulator B (15B), and the phase adjuster (16) from the branching filter (14), and whereas part thereof is photoelectrically converted by the photodiode (19), the light output from the light source 2 (21) propagates from right to left, i.e., it reaches the branching filter (14) from the multiplexer (17) via the phase modulator A (15A), phase adjuster (16) and phase modulator B (15B), and is finally photoelectrically converted by the photodiode (13).

The output from the photodiode (13), i.e., the light intensity monitor result of the light propagated in the opposite direction, arrives at the control circuit 1 (25), and the control circuit 1 (25) adjusts the bias voltage 1A (22A) and bias voltage 1B (22B) based on this information.

The output from the photodiode (19) having a frequency response characteristic not exceeding the bit rate, specifically, the RF power monitor result of the RF electrical signal obtained by photoelectrical conversion of the light outputted by the optical multiplexer (17) arrives at the control circuit 2 (27), and the control circuit 2 (27) adjusts the bias voltage 2 (26) based on this information.

Figure 9:
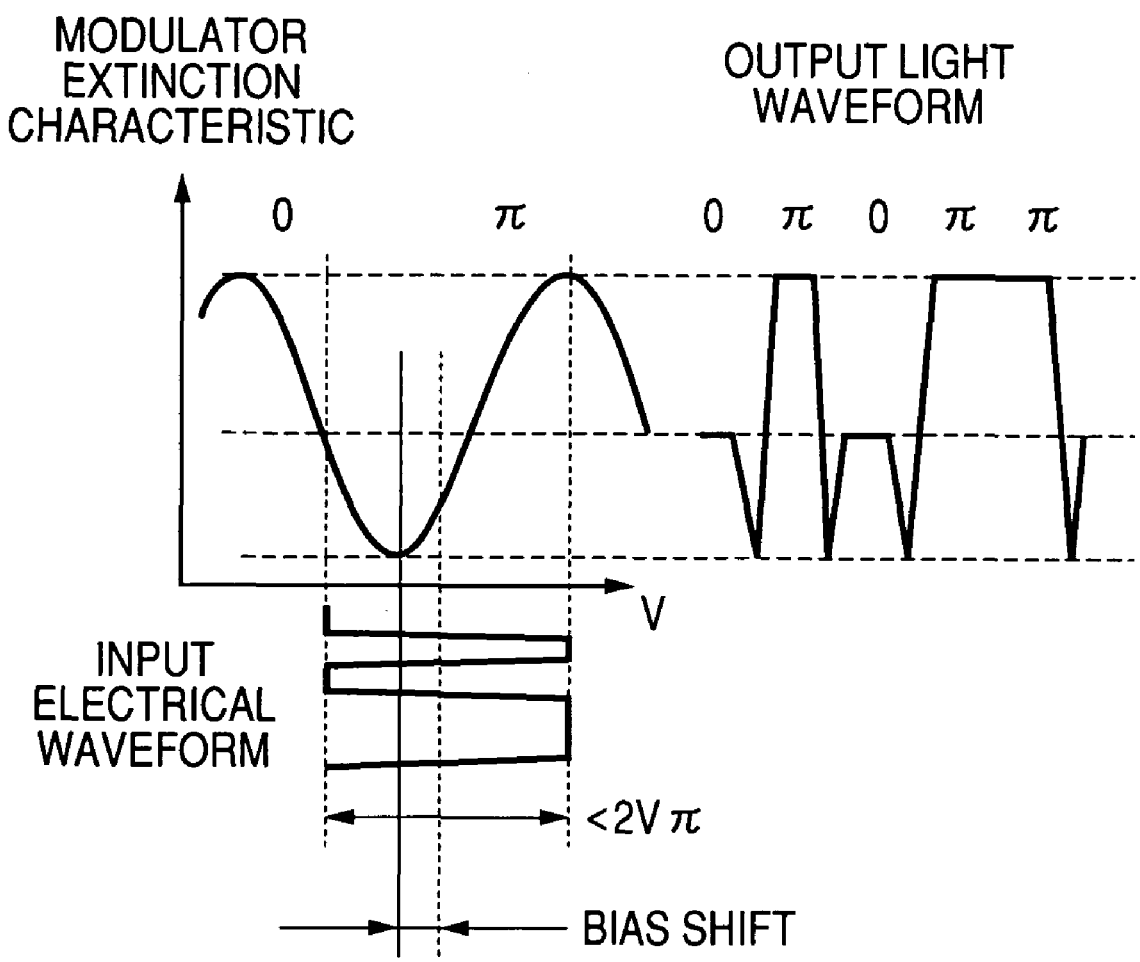
FIG. 9 shows a third example (when there is a bias shift) of phase modulation in a MZ modulator.

Under the effect of a bias drift, etc., when the bias voltage has shifted from the ideal bias voltage, there is a reduction in the amplitude of the phase modulator, as mentioned above in FIG. 5. In general, $V\pi$ of the phase modulator is a value of about 4-6V, and if it is attempted to obtain an amplitude of $2V\pi$ to perform binary phase modulation, a considerably large amplitude signal of 8-12V is required as the drive amplitude. To lower the cost of the transmitter, it is desirable to reduce the amplitude to some extent. FIG. 9 shows the modulation situation when the drive amplitude is less than $2V\pi$. When the modulation amplitude is reduced from $2V\pi$, the amplitude will be different for each adjacent data. In this case, since the average power is an intermediate value of these different amplitudes, the average power fluctuation accompanying the bias shift actually decreases.

Figure 5:
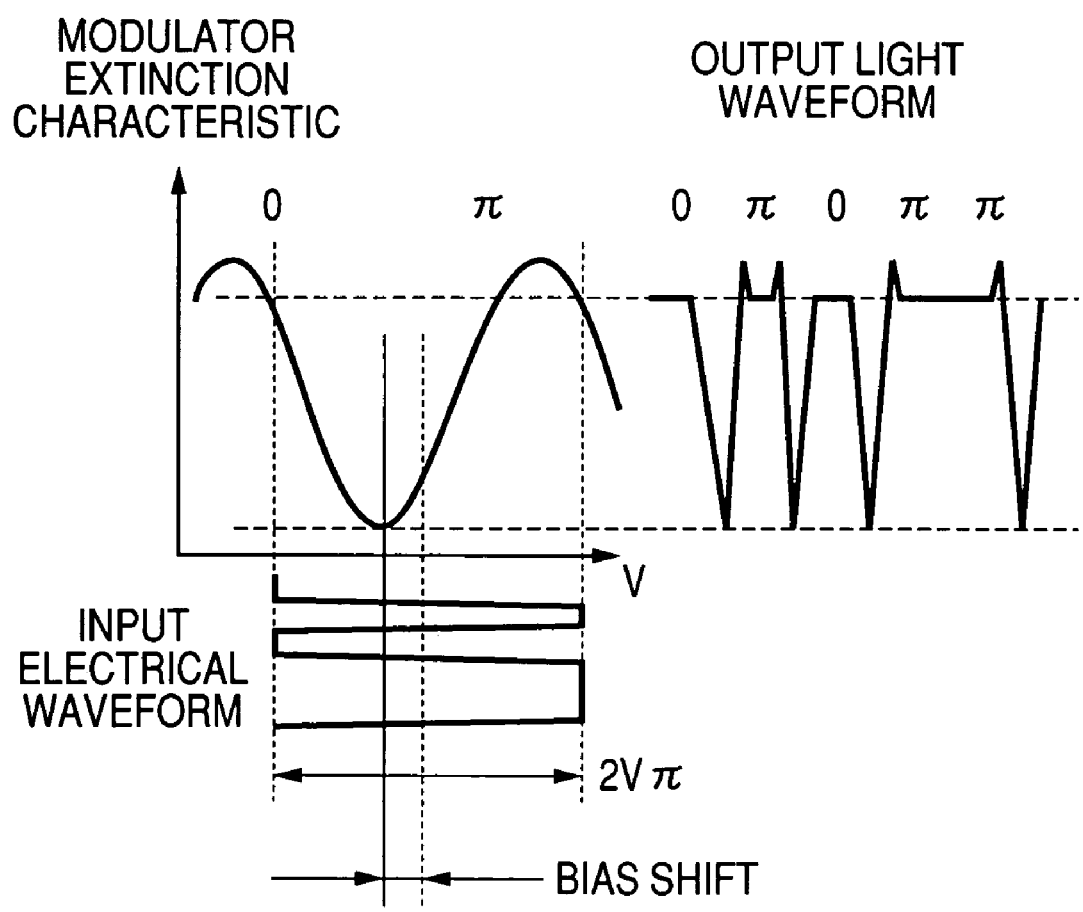
FIG. 5 shows a second example (when there is a bias shift) of phase modulation in a MZ type modulator.
Figure 6:
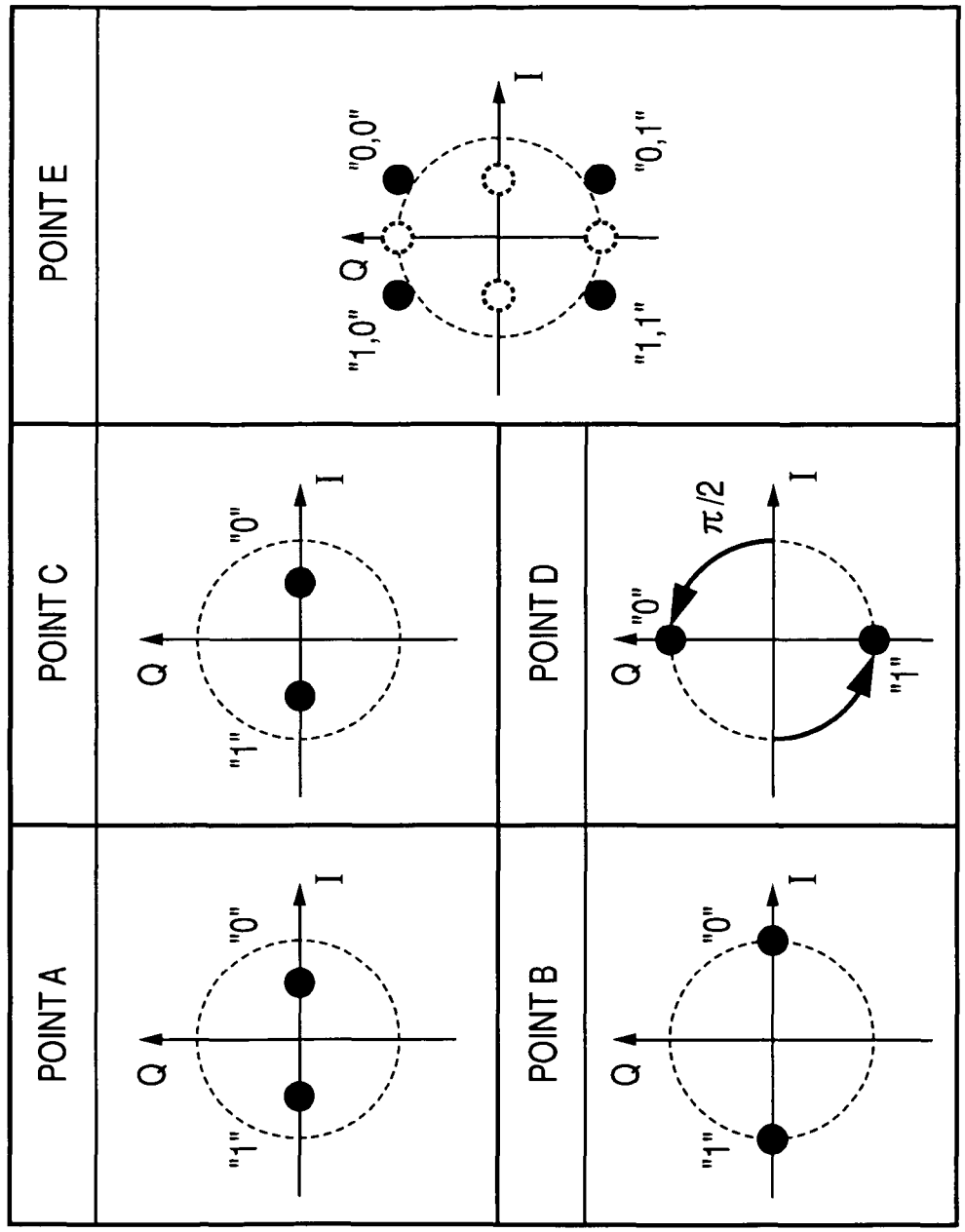
FIG. 6 shows a second example (when there is a bias shift) of a phase state in a quaternary phase modulator.
Figure 7:
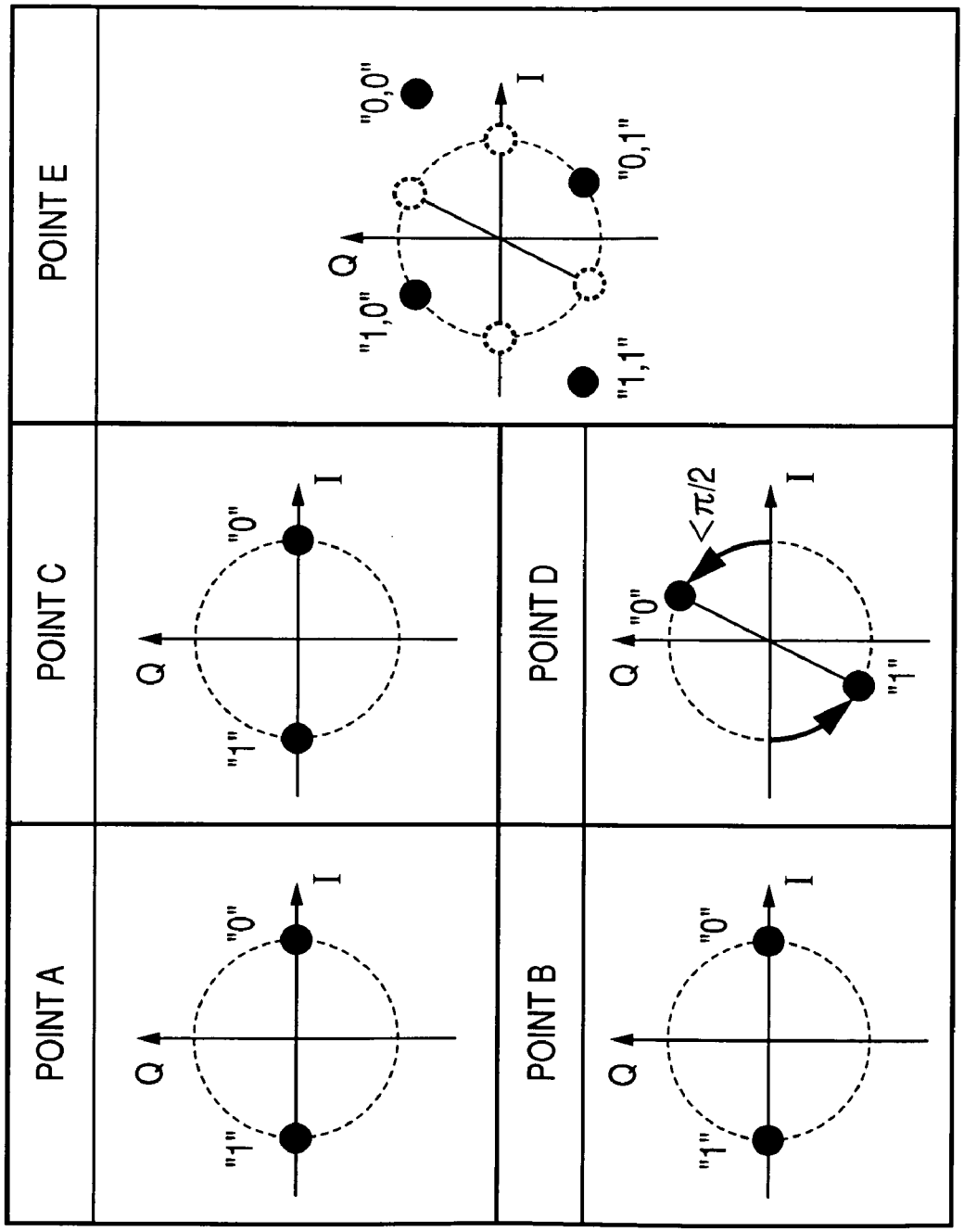
FIG. 7 shows a third example (when there is a bias shift) of a phase state in a quaternary phase modulator.
Figure 10:
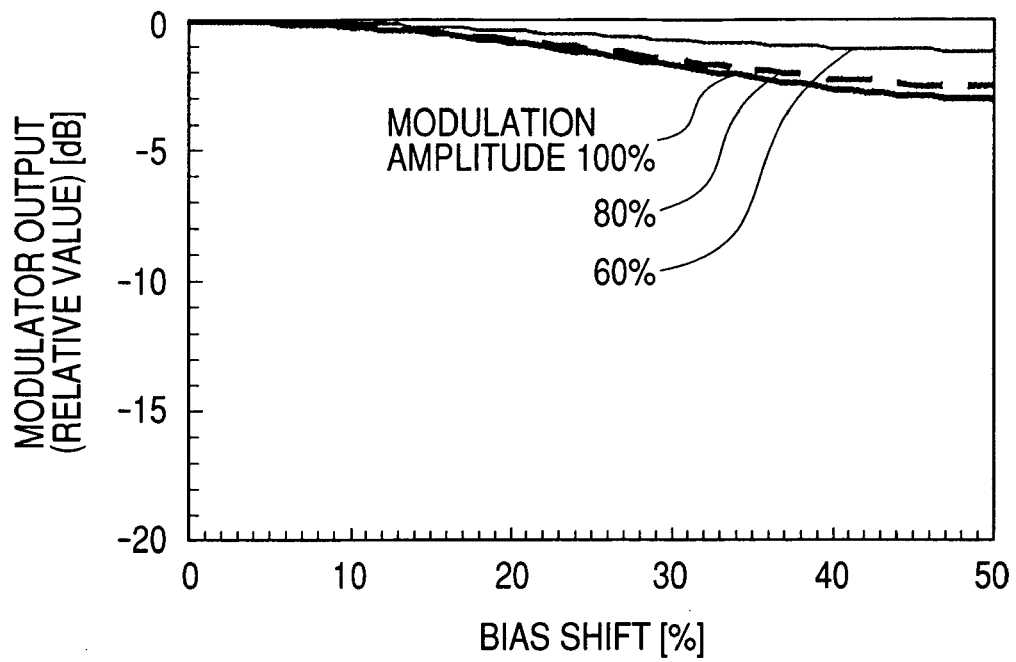
FIG. 10 shows an output characteristic of a quaternary phase modulator.

This situation is shown in FIG. 10. FIG. 10 shows a simulation result wherein the output of the modulator, i.e., the multiplexer (17), is plotted relative to the bias shift. The bias shift is normalized to $2V\pi$. Specifically, a bias shift amount of 50% is a bias shift amount corresponding to $V\pi$. Likewise, the modulation amplitude is also normalized to $2v\pi$. Specifically, a modulation amplitude of 100% is a modulation amplitude equivalent to $2V\pi$, and is the ideal modulation amplitude as shown in FIG. 5.

As the bias shift increases, the modulator output also gradually changes. Even if the bias has shifted by 50%, the variation is about 4 dB at most, while the modulation amplitude decreases from 100%, and the variation also decreases. Whatever the modulation amplitude is, if the bias shift is 10% or less, the variation is less than 0.2 dB and it is difficult to adjust the bias from the modulator output.

The case where the backward light which propagates in the opposite direction is monitored, as in the present invention, will now be described. The modulator used for high speed modulation such as 10 Gbps or 20 Gbps is usually a progressive wave modulator. A progressive wave modulator is a modulator which increases the interaction length of an electrical signal and a lightwave signal, and increases the modulation efficiency, when the modulating electrical signal and the light signal being modulated propagate in the same direction inside the modulator. Putting this another way, with a modulating electrical signal and a light signal that propagates in the backward direction, the interaction length decreases, so the modulation efficiency decreases considerably. Specifically, most of the light propagated in the backward direction is output from the modulator without being modulated. Therefore, for light propagated in the backward direction, the relation between the bias voltage and the output light coincides with the extinction characteristic itself. As a result, by minimizing the output light, it is possible to adjust the bias to the valley of the extinction coefficient, i.e., the bias voltage can be set to the maximum value.

Figure 11:
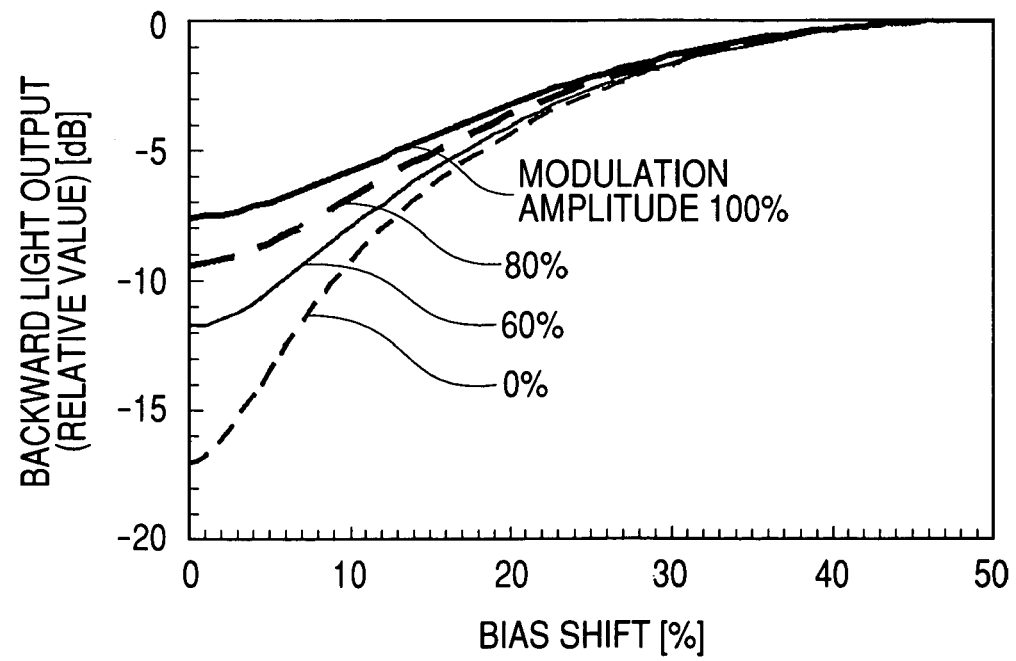
FIG. 11 shows backward light monitor characteristics of the quaternary phase modulator.

In practice, a data signal has a spectrum that contains not only high-speed components such as 10 GHz and 20 GHz, but is continuous from low speed frequencies. Since the interaction length of the aforesaid electrical signal and lightwave signal increases relatively in the case of these low-speed components, even in the case of light which propagates in the opposite direction, it will be modulated by low-speed frequency components. In this regard, FIG. 11 shows the result of a simulation of the relation between bias shift amount and modulator output (in this case, backward light output, i.e., the result monitored by the photodiode (13)), as in the case of FIG. 10, for the case of light which propagates in the backward direction where the modulation response frequency of the electrical waveform (frequency at which the response characteristics decrease by 3 dB) is 500 MHz, When the modulation amplitude is 0%, i.e. when there is no modulation, the monitor result changes by as much as 17 dB for a bias shift amount of 50%, so the sensitivity of the backward-propagated light output to the bias shift is very high. If the modulation amplitude increases, there is the additional effect that the back-propagated light is modulated by the aforesaid low-frequency components, and the variation of the back-propagated light output decreases. Even then, the variation of the back-propagated light output for a bias shift of 10% and modulation amplitude of 100% reaches 1.8 dB, which is a sufficient control sensitivity. The difference is clear even compared to the 0.2 dB result of the aforesaid ordinary output monitoring.

Thus, by monitoring the light propagated in the backward direction by the photodiode (13), and controlling the bias 1A (22A) so that the monitored intensity is a minimum, or does not exceed a specified value, by means of the control circuit 1 (25), the bias of the phase modulator A (15A) can be maintained at an optimum point.

Figure 4:
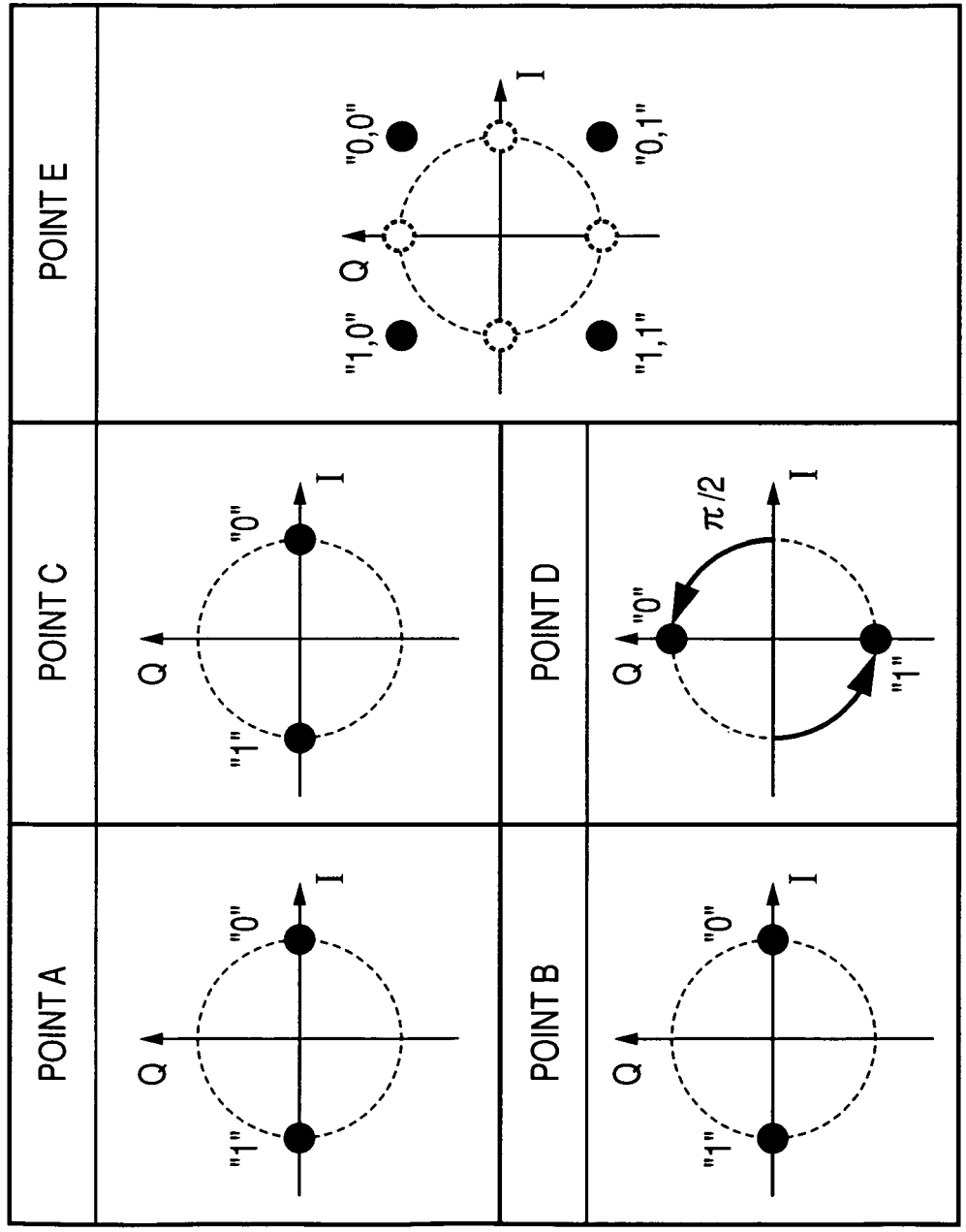
FIG. 4 shows an example of a phase state in a quaternary phase modulator.
Figure 12:
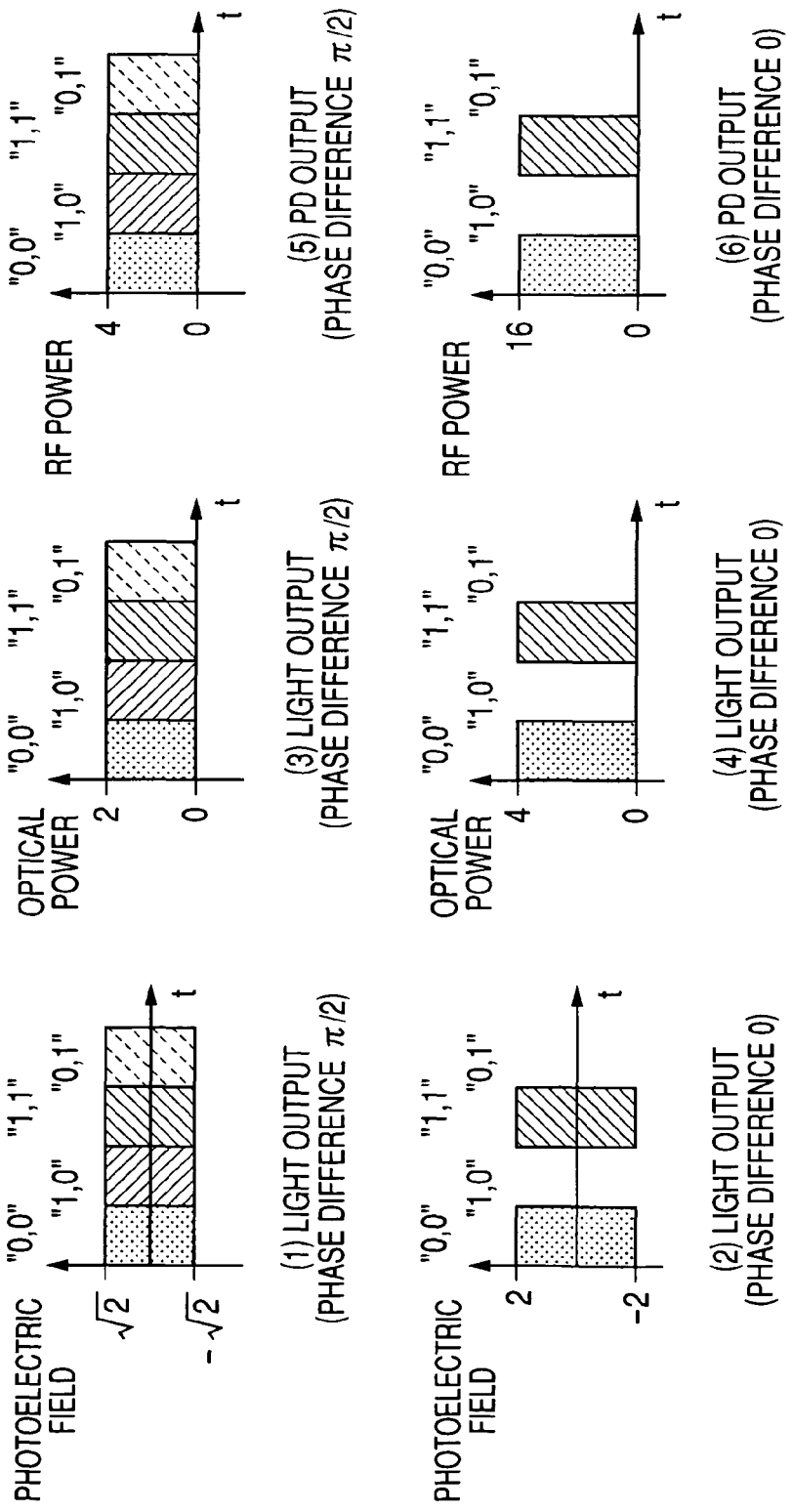
FIG. 12 is a schematic diagram describing deterioration of orthogonality in a quaternary phase modulator.

Now, the control of the phase adjuster (16) will now be described. The case will be considered where at the aforesaid phase point shown in FIG. 4, the data changes in the order "0, 0", "1, 0", "1, 1", "0, 1." FIG. 12 is a figure schematically showing the photoelectric field, optical power, and RF Power after reception by the photodiode (19) when the phase difference is ideal, i.e., $\pi/2$, or in the worst case, i.e., when the phase difference is zero. First, when the phase difference is $\pi/2$, the photoelectric field amplitude of the light output is always constant, for example $\pm\sqrt{2}$ as shown in FIG. 12(1). Since the light power is proportional to the square, this is for example 2 as shown in FIG. 12(3). If this is subjected to photoelectrical conversion, a current proportional thereto will be outputted. As a result, the RF power will also be proportional to the square, and is a fixed value (=4, as shown in FIG. 12(5)).

On the other hand, when the phase difference is zero, the data "1, 0", "0, 1" give a photoelectric field amplitude of zero, whereas "0, 0", "1, 1" give an electric field amplitude of 2. As a result, the optical power alternates between 4 and 0, and the average value is 2. When this is subjected to photoelectrical conversion, a current proportional thereto is output, and as a result, the RF power which is proportional to the square alternates between 16 and 0, so the average value is 8. Specifically, in the case of an RF power monitored using a photodiode with a response characteristic comparable to that of the transmission signal, it is seen that the phase difference can be adjusted to $\pi/2$, i.e., the ideal state, by making this monitor result a minimum.

Figure 13:
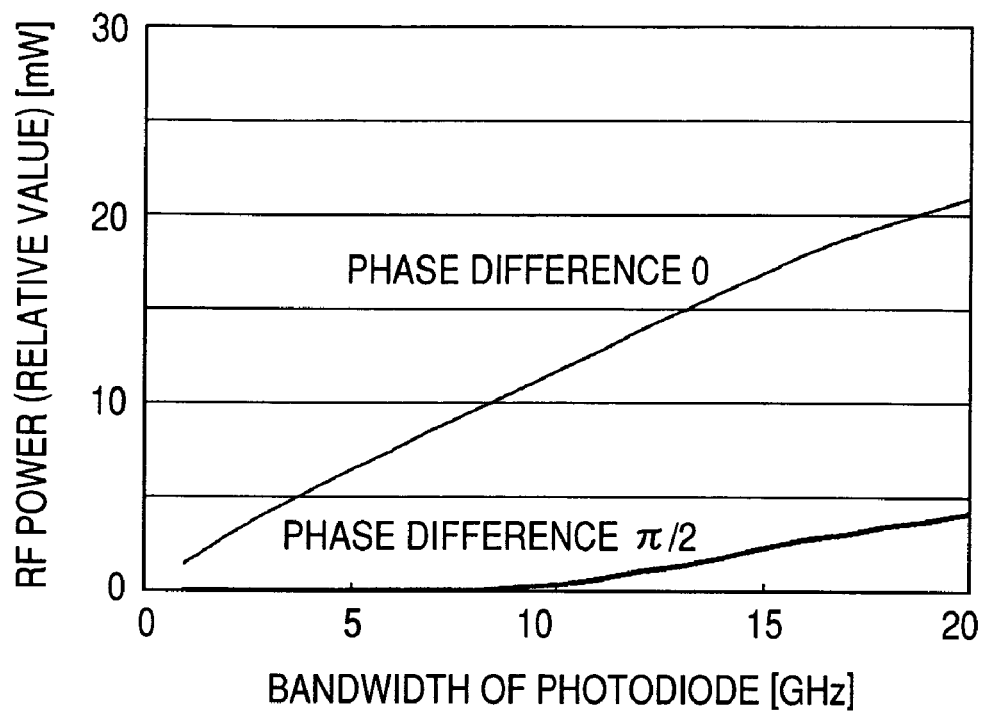
FIG. 13 shows RF power monitor characteristics of a quaternary phase modulator.

FIG. 13 shows the result of a simulation of the monitor result of RF power when the phase difference is arranged to be $\pi/2$ or 0. In this simulation, a RZ (Return-to-Zero)-DQPSK (Differential QPSK) signal of 40 Gbps, i.e., a quaternary phase modulation signal, was formed using two 20 Gbps signals, and the RF power when the output was photoelectrically converted by a photodiode was calculated using the bandwidth of the photodiode (horizontal axis) as a parameter. The value (vertical axis) of the RF power is a relative value. The monitor result for a phase difference of 0 and the monitor result for a phase difference of $\pi/2$ both decrease together with decrease of bandwidth, but even at a bit rate of 1/10 using a commercial photodiode having a bandwidth of for example 2.5 GHz, the sensitivity deterioration is about 1/10, so sufficient control sensitivity can be maintained.

Thus, by controlling the bias 2 (26) by the control circuit 2 (27) so that the RF power obtained by monitoring the output of the modulator by the photodiode (19) having frequency response characteristics not exceeding the bit rate, is a minimum value, or does not exceed a specified value, the bias of the phase adjuster (16) can be maintained at an optimum point.

Figure 14:
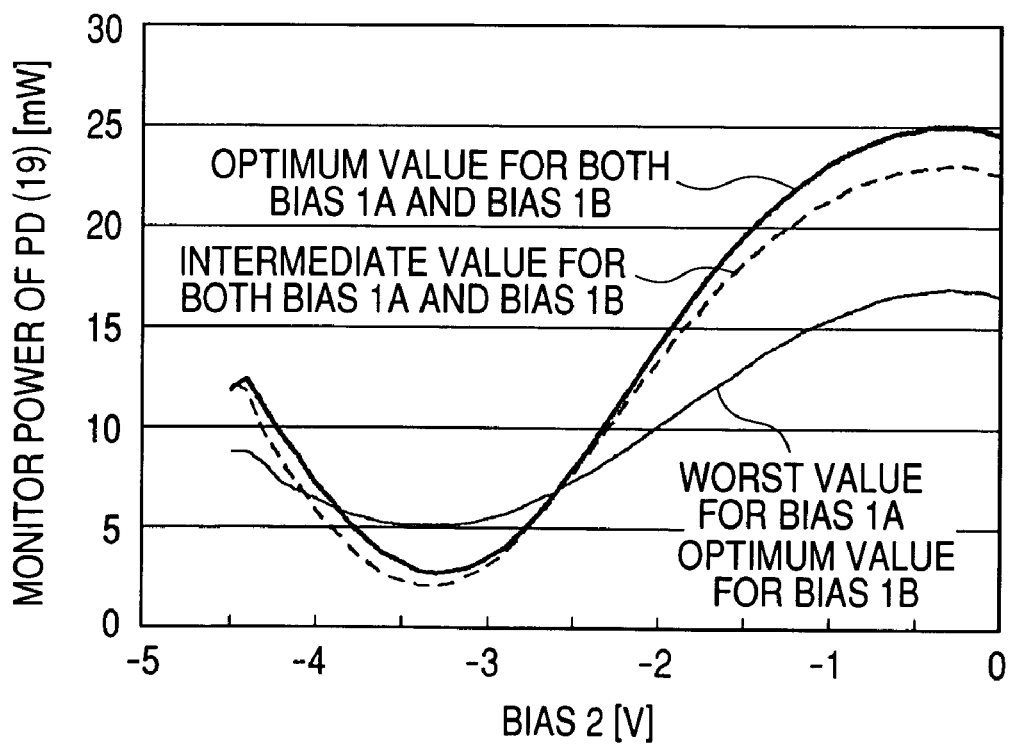
FIG. 14 shows the effect of a phase modulator bias on a phase adjuster bias.

Here, the mutual effect accompanying the bias control of the phase A (15A), phase modulator B (15B), and phase adjuster (16) will be described. FIG. 14 is a figure describing the effect of another bias control of the bias characteristic of the phase adjuster (16). This diagram is an experimental result which measured the modulation output of a RZ-DQPSK signal of 40 Gbps using a photodiode of 2.5 GHz bandwidth, while varying the bias of the phase adjuster. An evaluation was performed for three bias states of the two phase modulators, i.e., (1) both optimum values, (2) an intermediate value between both optimum values and both worst values, (3) one worst value and one optimum value. As shown in the diagram, the amplitude of the variation characteristic of monitor power changes with the bias states of the two phase modulators, but the bias voltage in a valley, i.e., the control convergence point when minimization control is performed, hardly changes at all. Specifically, in the bias control of the phase adjuster, the effect of the bias state of the two phase modulators is minor.

Figure 15:
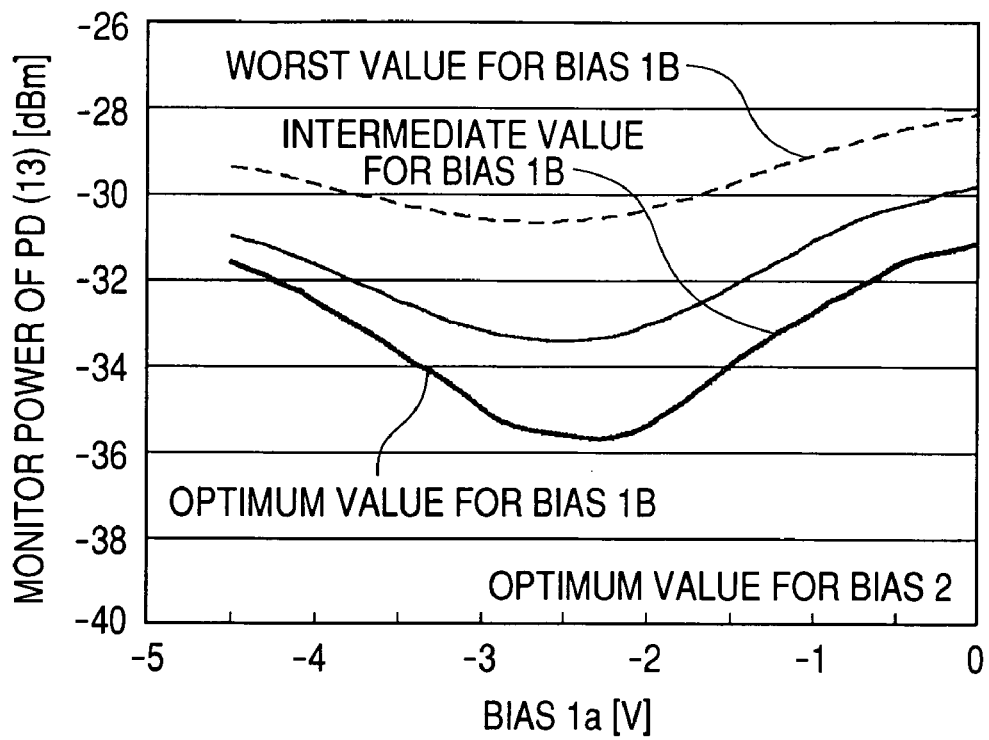
FIG. 15 shows one effect of the phase adjuster bias on the phase modulator bias.
Figure 16:
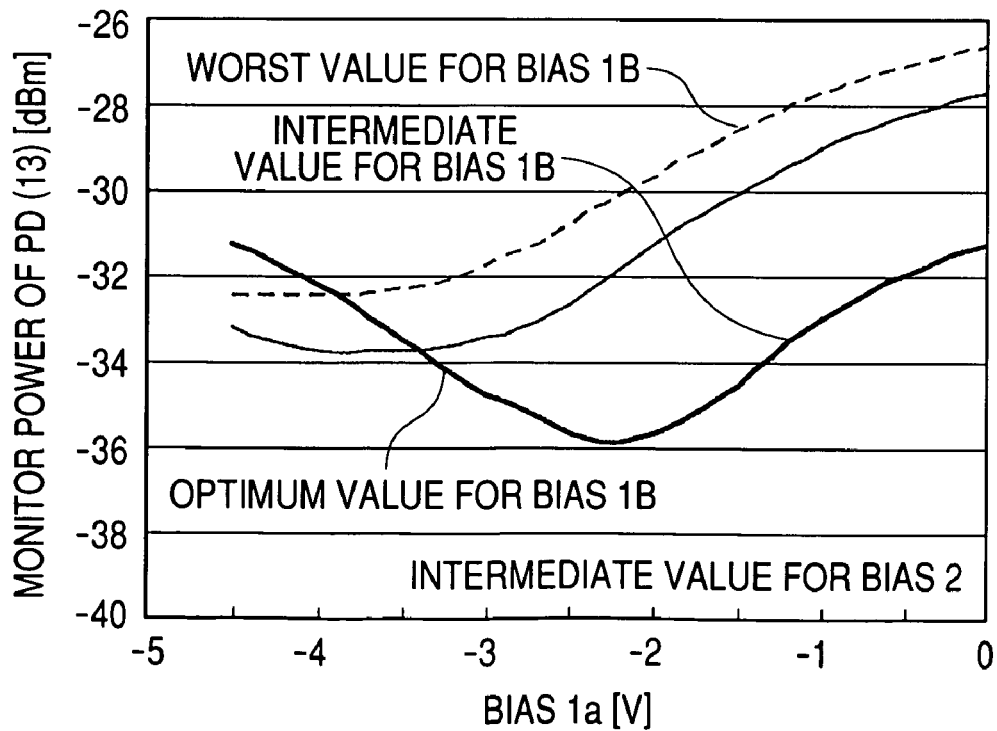
FIG. 16 shows a second effect of the phase adjuster bias on the phase modulator bias.
Figure 17:
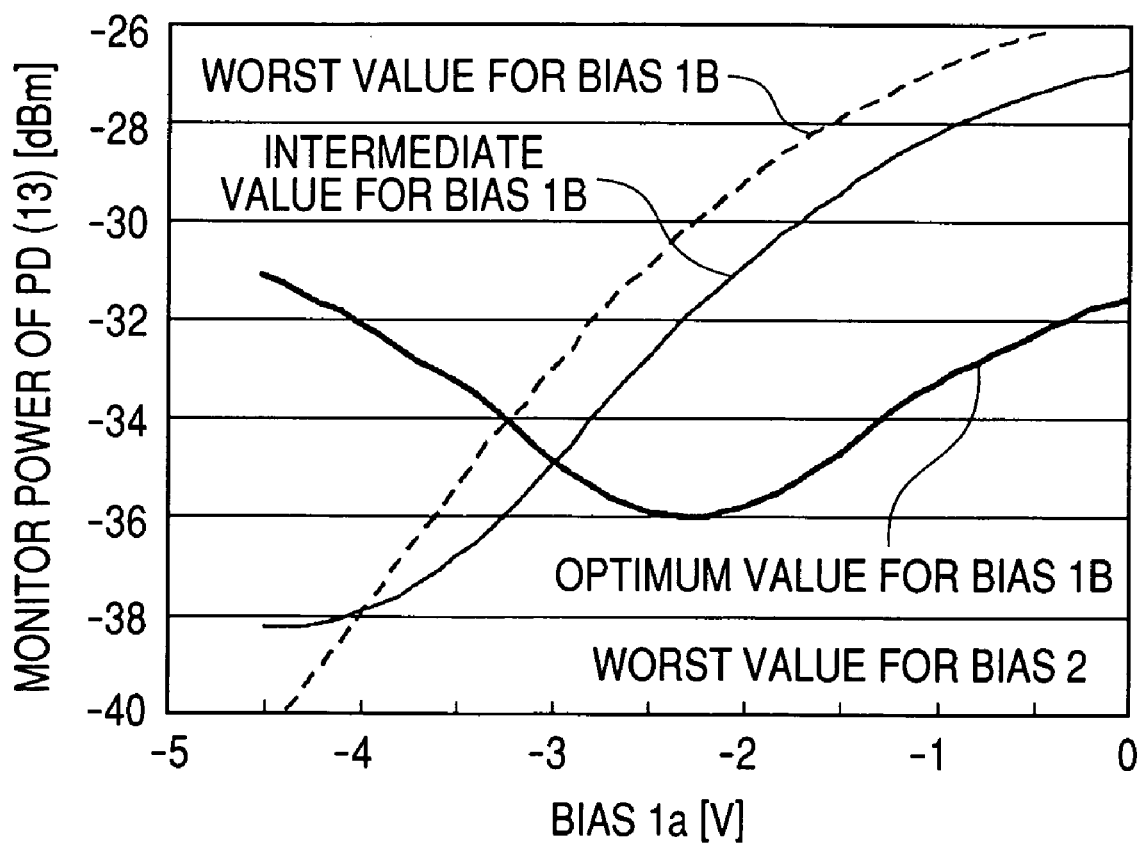
FIG. 17 shows a third effect of the phase adjuster bias on the phase modulator bias.
Figure 19:
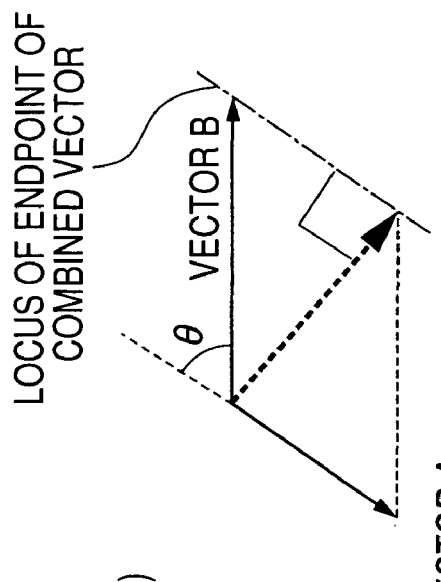
FIG. 19 shows a schematic diagram 2 describing the effect of the phase adjuster bias on the phase modulator bias.

On the other hand, FIGS. 15, 16, and 17 are diagrams describing the effect of another bias control on the bias characteristic of the phase modulator 1A (15A). As in the case of FIG. 14, these are also experimental results obtained by measuring the monitor output of the backward light of a RZ-DQPSK signal of 40 Gbps, while varying the bias of the phase modulator. An evaluation was performed for three bias states of the other phase modulator, i.e., (1) the optimum value, (2) an intermediate value between the optimum value and the worst value, (3) the worst value. As the bias of the phase adjuster, FIG. 15 shows the optimum value, FIG. 16 shows an intermediate value between the optimum value and the worst value, and FIG. 17 shows the worst value.

As shown in FIG. 15, when the bias 2 is an optimum value, the bias 1A is a minimum value in the vicinity of −2.5V regardless of the bias state 1B. Specifically, the control convergence point when the bias 1A is subjected to minimization control hardly changes at all even if the bias 1B changes, and the bias 1B and bias 1A can be minimization-controlled independently.

However, as shown in FIG. 16, the situation is different when the bias 2 is an intermediate value. In this case, the minimum value of the bias 1A changes according to the value of the bias 1B, the bias 1B shifts from the optimum value to the worst value, and the minimum value of the bias 1A shifts to the negative side. Specifically, the control convergence point when the bias 1A is minimization-controlled depends on the bias 1B. As a result, when the bias 1A and bias 1B are controlled independently, the mutual control convergence point changes due to the effect of the interaction, and the output waveform changes in an unstable manner without the control converging. Referring to FIG. 17, it is seen that this tendency becomes even stronger when the bias 2 is the worst value.

Thus, although the bias control of the phase adjuster is hardly affected by the bias of the two phase modulators, the bias control of the two phase modulators is strongly affected by the bias of the phase period. The reason can be understood from the schematic diagrams shown in FIG. 18 and FIG. 19.

FIG. 18 is a schematic diagram showing the situation of the backward light when the bias 2 is an optimum value, i.e., when the phase difference is π/2, and the two phase modulation components are orthogonal. The backward light which penetrates the phase modulator A (15A) is represented by a vector A, and the backward light which penetrates the phase modulator B (15B) is represented by a vector B. The vector lengths of the vector A and vector B represent the light intensity. The vector A and vector B are subject to a combined electric field, i.e., a combined vector, in the branching filter (14). The light received by the photodiode (13) is a vector shown by the dotted line, i.e., a combined vector of the vector A and vector B.

Here, the case will be considered where the bias of the phase modulator A (15A) is adjusted while the bias of the phase modulator B (15B) is fixed at a specified value. This operation is equivalent to the operation, in FIG. 18, of changing the length of the vector A while the length of the vector B is fixed. The operation of monitoring the intensity of the photodiode (13), is equivalent to an operation which measures the length of the combined vector. Specifically, the operation of adjusting the bias of the phase modulator A (15A) so that the backward light is a minimum is equivalent to the operation of adjusting the length of the vector A so that the length of the combined vector is minimized.

As is clear from the fact that the length of the vector A changes from a positive to a negative value in Case 1, Case 2, and Case 3, of FIG. 18, the length of the combined vector is a minimum when the vector A is a zero vector. Specifically, the vector A can be minimized regardless of the state of vector B, therefore the bias of the phase modulator A and phase modulator B can be minimization-controlled independently.

However, this argument does not hold when the bias 2 shifts from the optimum value (i.e., when the orthogonality of the vector deteriorates), as shown in FIG. 16. That is, rather than the case where the vector A is a zero vector as in Case 2, there is Case 3 where the length of the combined vector is a minimum. The length of the combined vector is a minimum in Case 3, where the locus (trace) of the endpoint of the combined vector when the length of the vector A is changed and the combined vector intersect perpendicularly. The length of the vector A at this time depends on the length of the vector B when the angle (the acute angle side is selected) made by the two vectors is θ, except for the case where θ is π/2, since cos θ is multiplied by the length of the vector B. Specifically, this means that when they do not intersect perpendicularly, the control convergence point of the phase modulator A varies according to the bias of the phase modulator B.

It is seen that, whereas in the bias control of the phase adjuster, there is hardly any effect due to the bias of the two phase modulators, in the bias control of the two phase modulators, there is a strong effect due to the bias of the phase period. Hence, it is possible to stably control the phase adjuster (16) of the quaternary phase modulator shown in FIG. 8, and the two phase modulators (15A, 15B), by performing control according to the flowchart shown in FIG. 20. Specifically, Control 2 (bias control of the phase adjuster, i.e., control of orthogonality) is performed before Control 1 (bias control of the phase modulator), and the bias of each phase modulator is controlled while maintaining orthogonality. Hence, the phase adjuster and phase modulator can be controlled without being affected by the other phase modulator and phase adjuster, which was described referring to FIG. 15, FIG. 16, FIG. 17, FIG. 18 and FIG. 19.

The present invention not only compensates a bias drift of the phase modulators or the phase adjuster, but it is also effective for absorbing individual variations in the ideal characteristics of the phase modulators or phase adjuster, effective for controlling a shift from a voltage of zero volts, for control in the case of starting from a preset initial value (default value) and bringing the device to operational stability, and particularly effective for control in the case of starting up a device.

Figure 21:
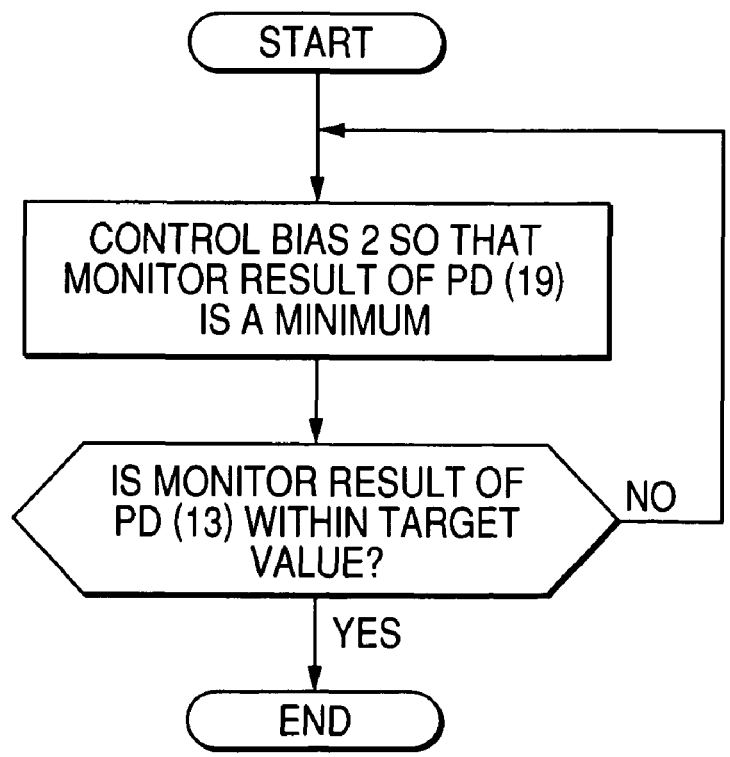
FIG. 21 shows an example of a phase adjuster bias control process.
Figure 22:
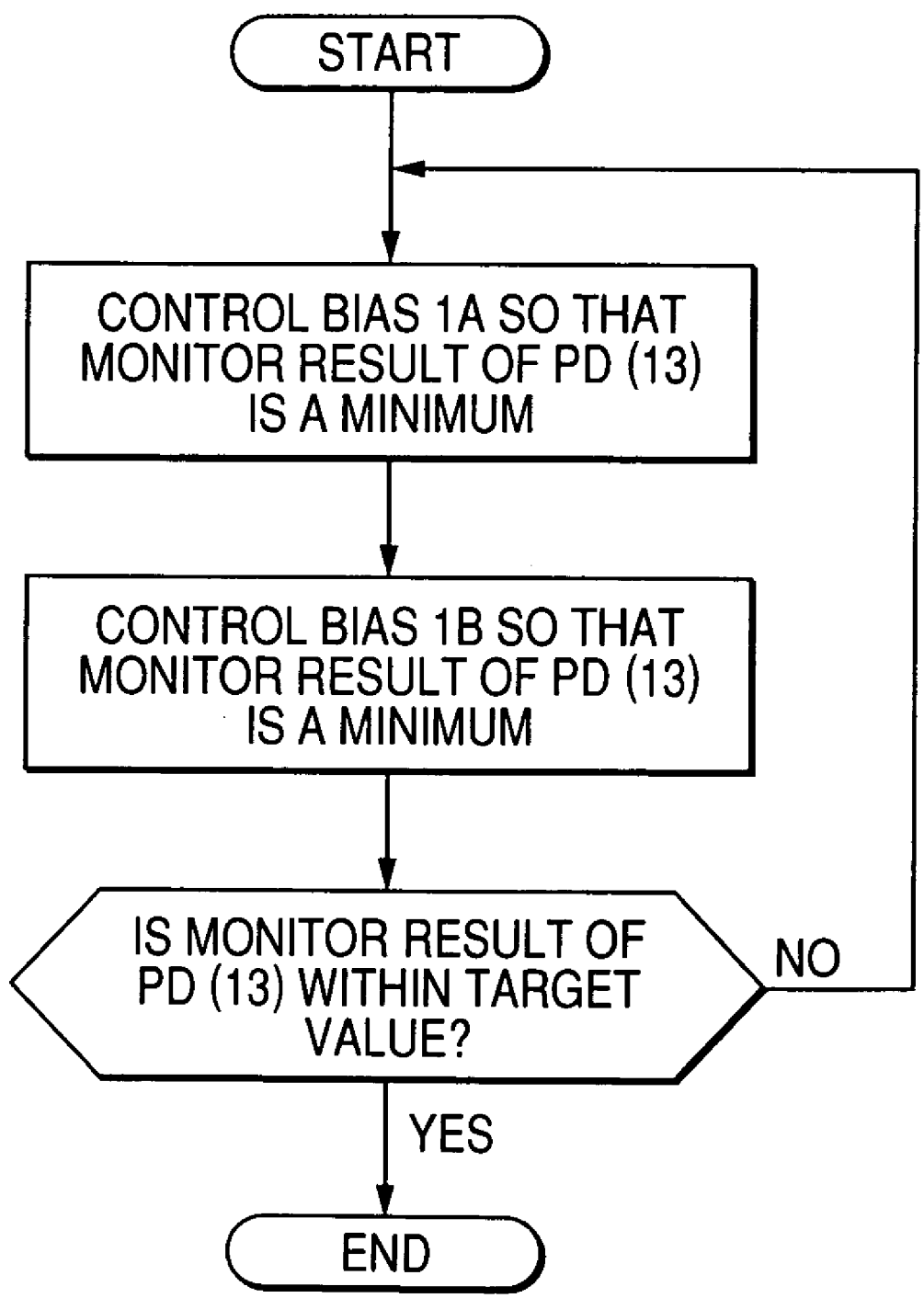
FIG. 22 shows a first example of a phase modulator bias control process.
Figure 23:
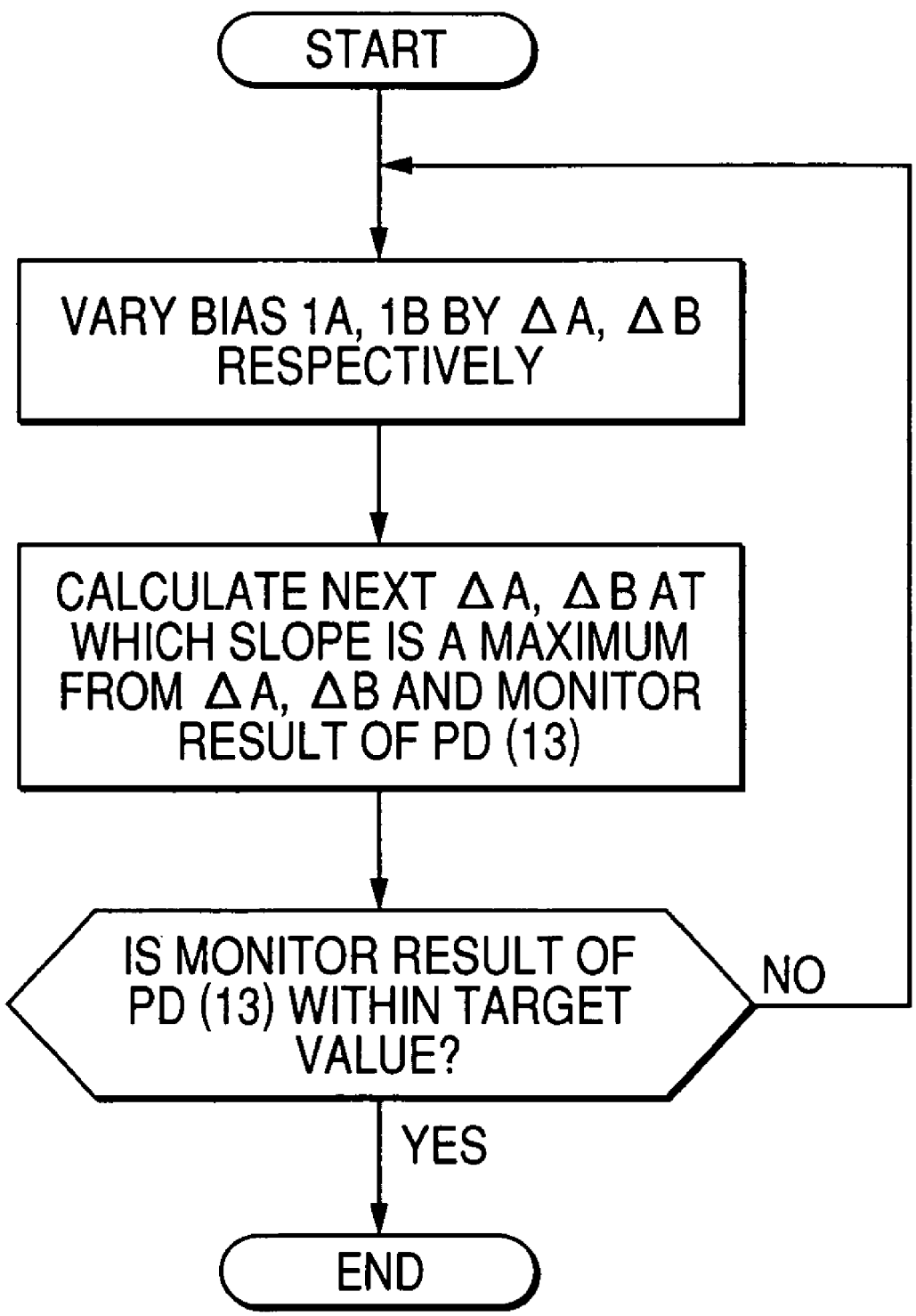
FIG. 23 shows a second example of a phase modulator bias control process.

As the control process of Control 2, the minimization control shown in FIG. 21 is suitable, for example. As the process of a 2 variable control such as Control 1, as shown in FIG. 22 for example, sequential control which first minimizes the bias 1A and then minimizes the bias 1B is appropriate. It is also possible to use a process known as the mountain climbing method wherein the bias 1A and bias 1B are respectively made to vary by ΔA, ΔB, and the next ΔA, ΔB at which the slope is a maximum together with the variation amount in the monitor result are sequentially calculated repeatedly.

Figure 24:
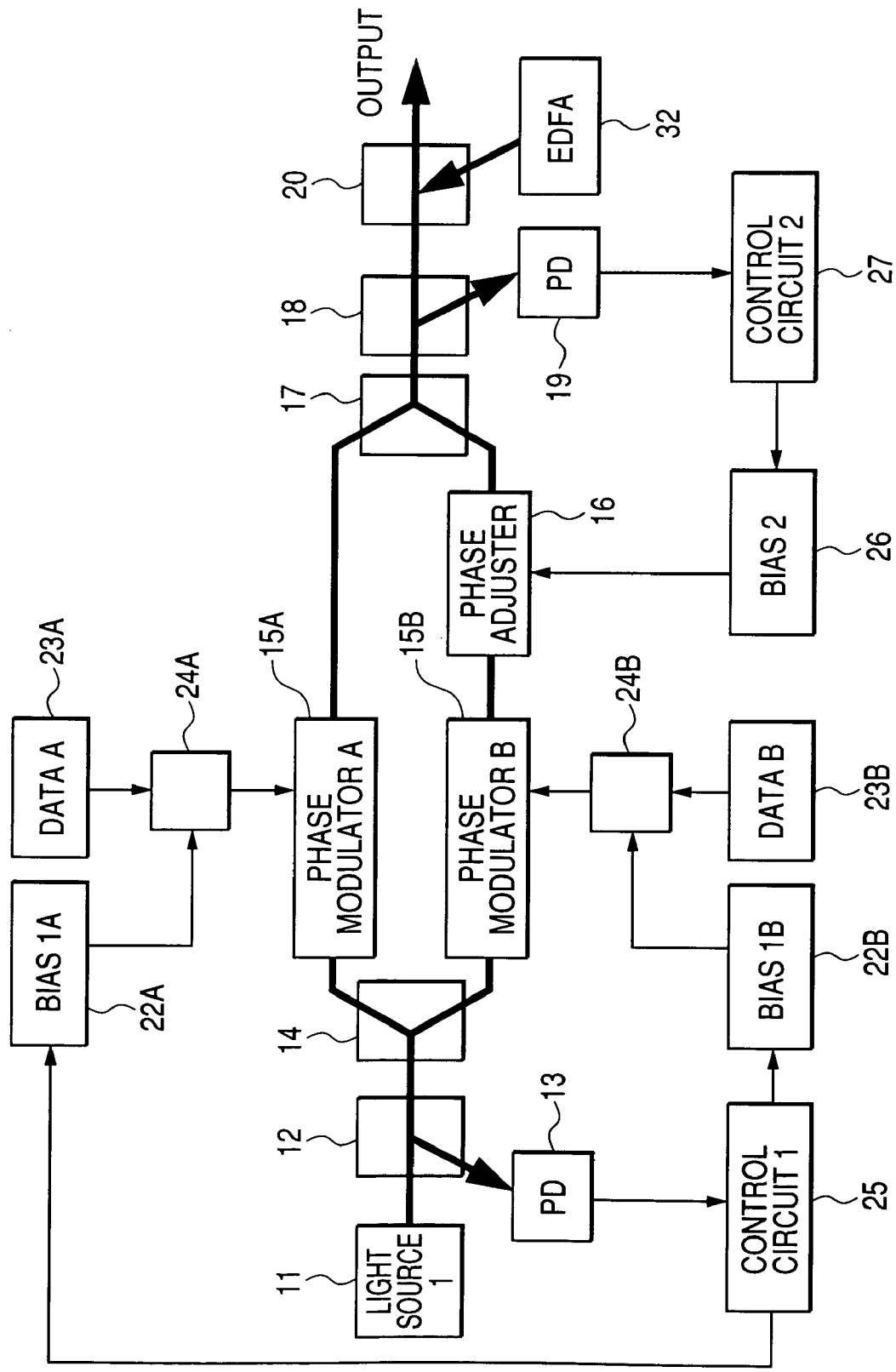
FIG. 24 shows another aspect 1 of the first embodiment.
Figure 25:
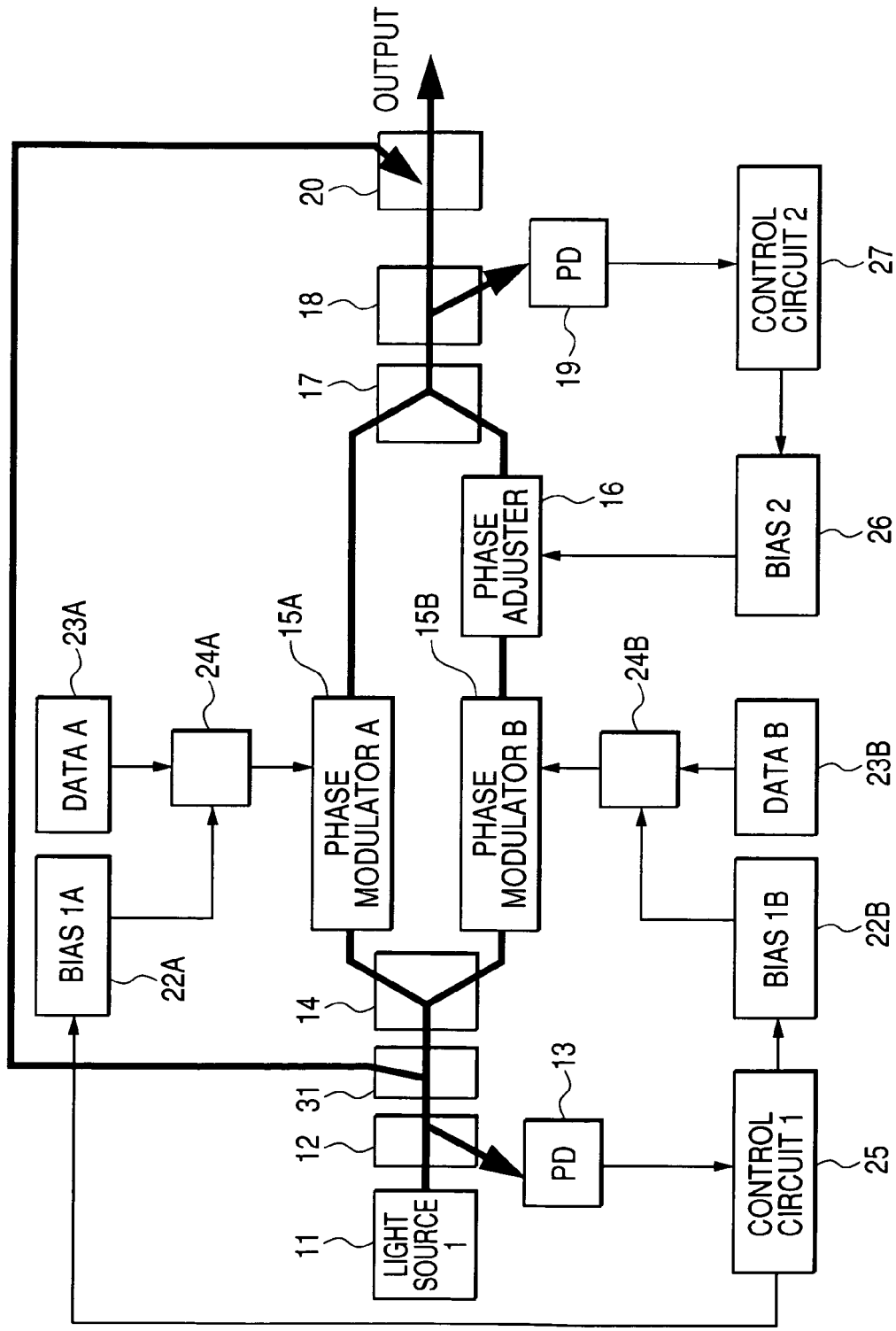
FIG. 25 shows another aspect 1 of the first embodiment.
Figure 26:
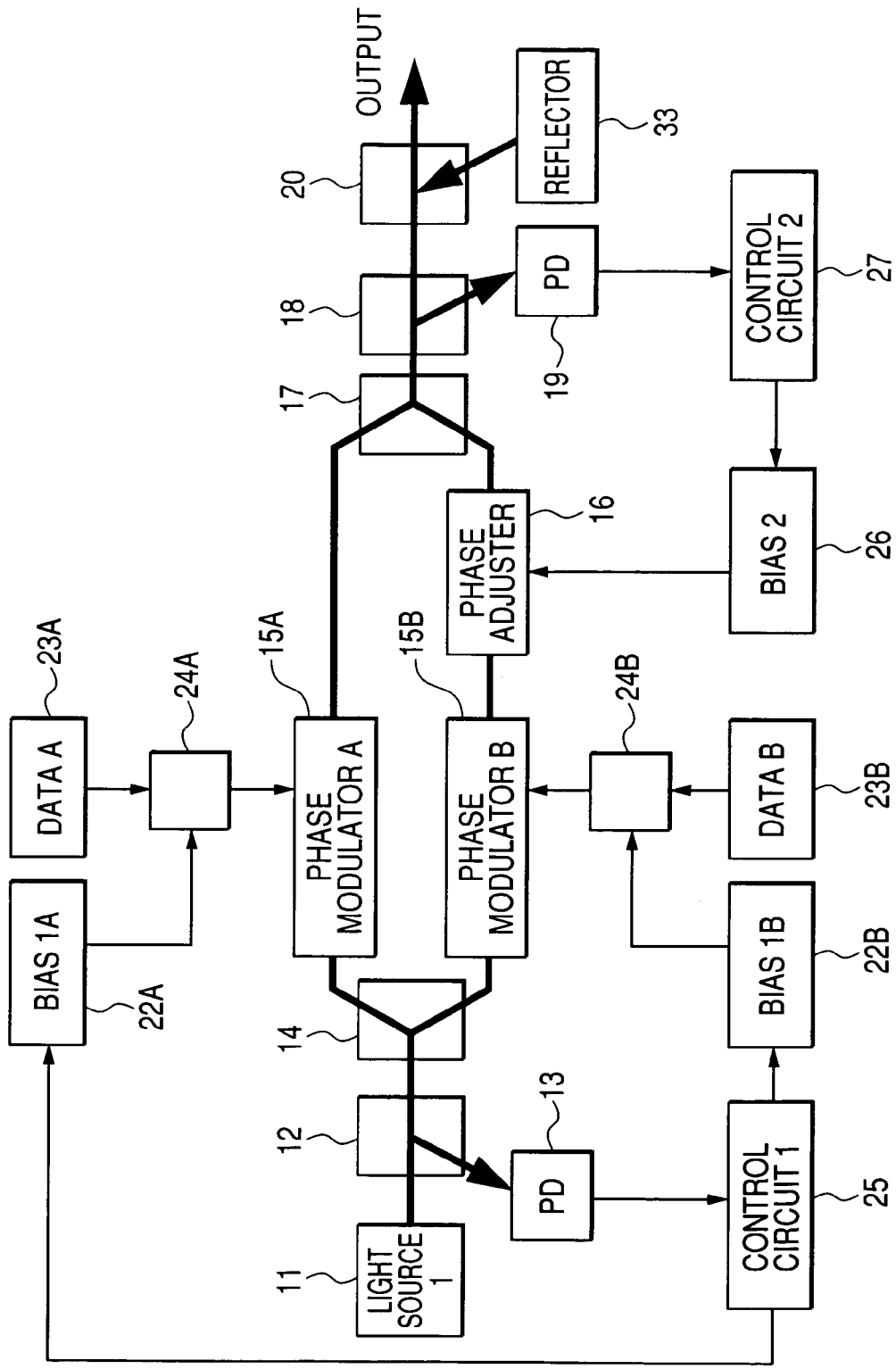
FIG. 26 shows another aspect 1 of the first embodiment.

As a means of implementing the backward light (21), a laser light source or a LED light source may be used. If the spontaneous emission light from an erbium addition amplifier (EDFA, 32) is used, as shown in FIG. 24, there is the advantage that the polarized wave adjustment of the backward light and phase modulator can be omitted. As shown in FIG. 26, part of the signal light source may be split by the branching filter (31) and looped back to substitute for the backward light source. Also, as shown in FIG. 26, part of the signal light may be reflected by a reflector (33) and reversed to substitute for the backward light source. These methods of substituting the backward light source may be likewise applied to the other embodiments shown below.

There is no predominant difference in the arrangement order of the phase modulator B (15B) and phase adjuster (16), and even if the phase adjuster (16) is arranged ahead of the phase modulator B (15B), this patent can still be applied satisfactorily. It can likewise be applied to the other embodiments shown below.

As the material of the phase modulators or phase adjuster, the present invention can apply any material, e.g., a semiconductor such as $LiNbO_3$ (lithium niobate), GaAs or InP.

It may likewise be applied when the phase modulators and phase adjuster are formed on an integrated waveguide path, or when they are manufactured by connecting individual components, and may likewise be applied in the other embodiments shown below.

Second Embodiment

Figure 8:
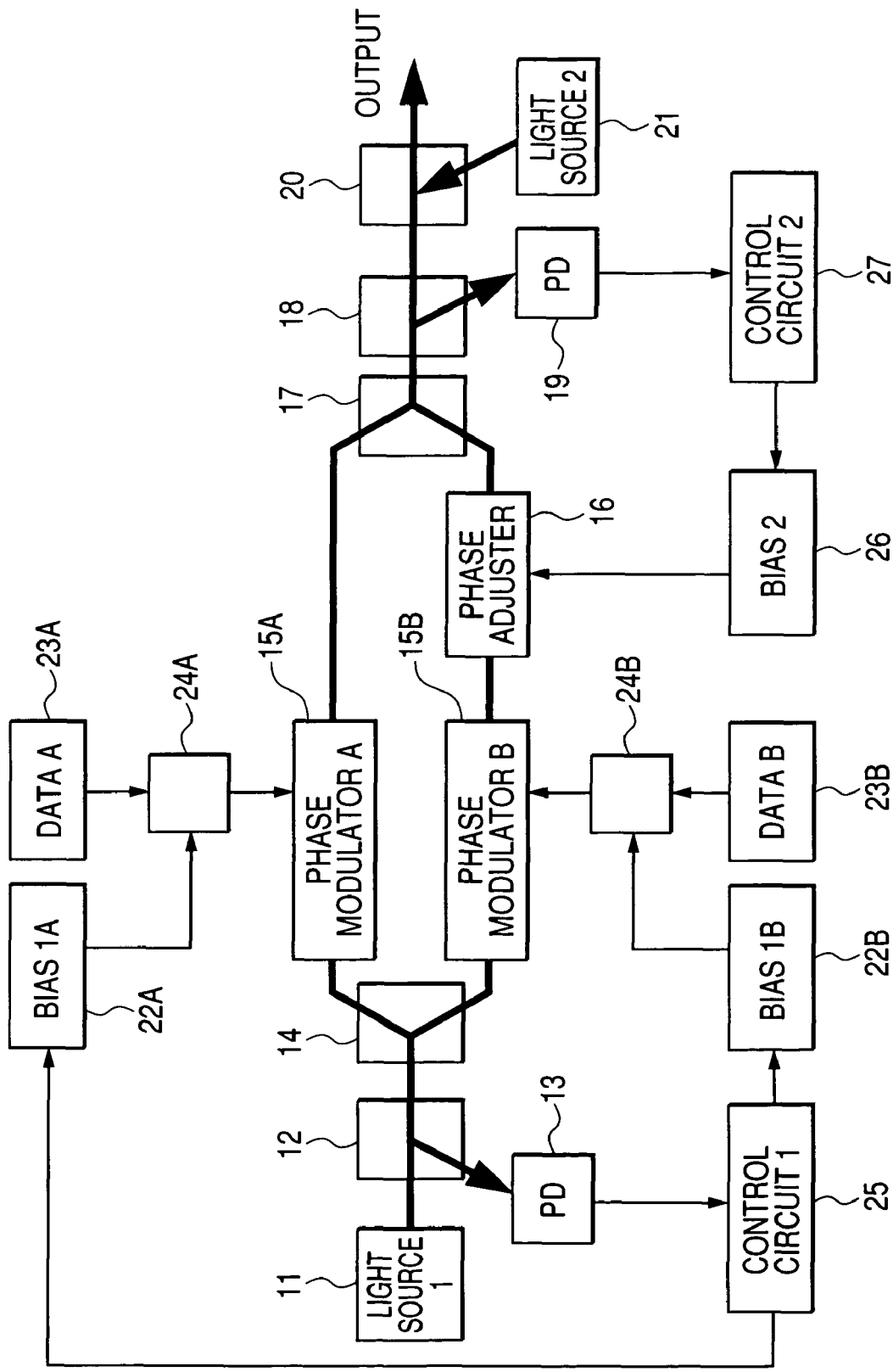
FIG. 8 shows the configuration of first and second embodiments.
Figure 27:
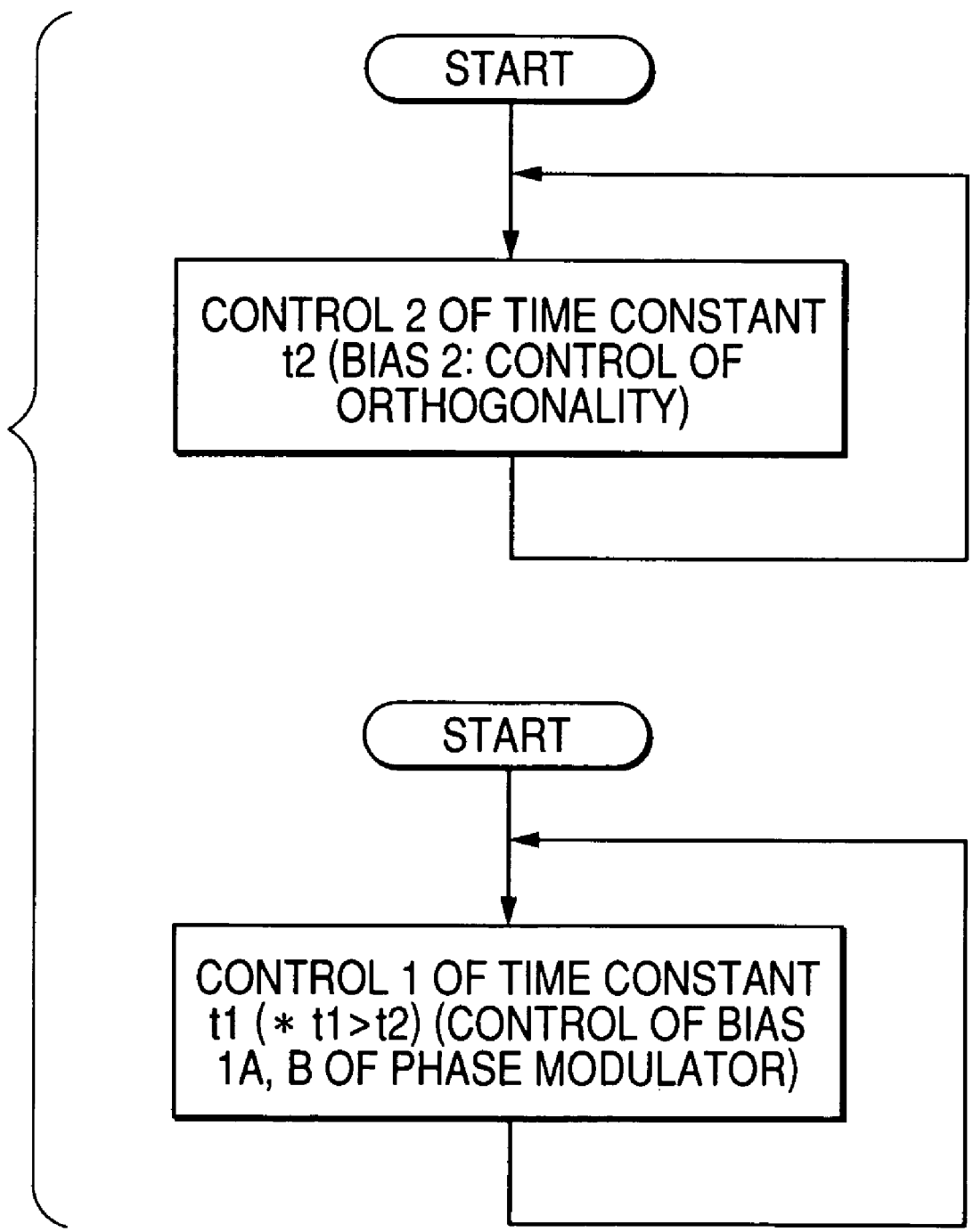
FIG. 27 shows a control process in the second, fourth, and sixth embodiments.

A second embodiment of the present invention will now be described referring to FIG. 8 and FIG. 27. In FIG. 8, the phase adjuster (16) of the quaternary phase modulator and the two phase modulators (15A, 15B) shown in FIG. 8 can be stably controlled by performing control according to the flowchart of FIG. 27. Specifically, by independently performing Control 1 (control of the bias of the phase modulators) by a time constant t1, and Control 2 (control of the bias of the phase adjuster, i.e., control of orthogonality) by a time constant t2, respectively, by making the time constant t2 of Control 2 shorter than the time constant t1 of Control 1, and by performing Control 2 at a higher speed, the bias of each phase modulator can be controlled giving priority to orthogonality control. Hence, the phase adjuster and phase modulators can be controlled without being affected by the other phase modulator and phase adjuster.

Regarding the difference in the control time constant, if the difference is about for example one order of magnitude, as in the case t1>10×t2, there is no problem as regards stable operation. Further, if there is a certain degree of restriction on the time constant such as the limit of a sample hold circuit, the invention may still be applied without a problem even if the restriction is several orders of magnitude.

Third Embodiment

Figure 28:
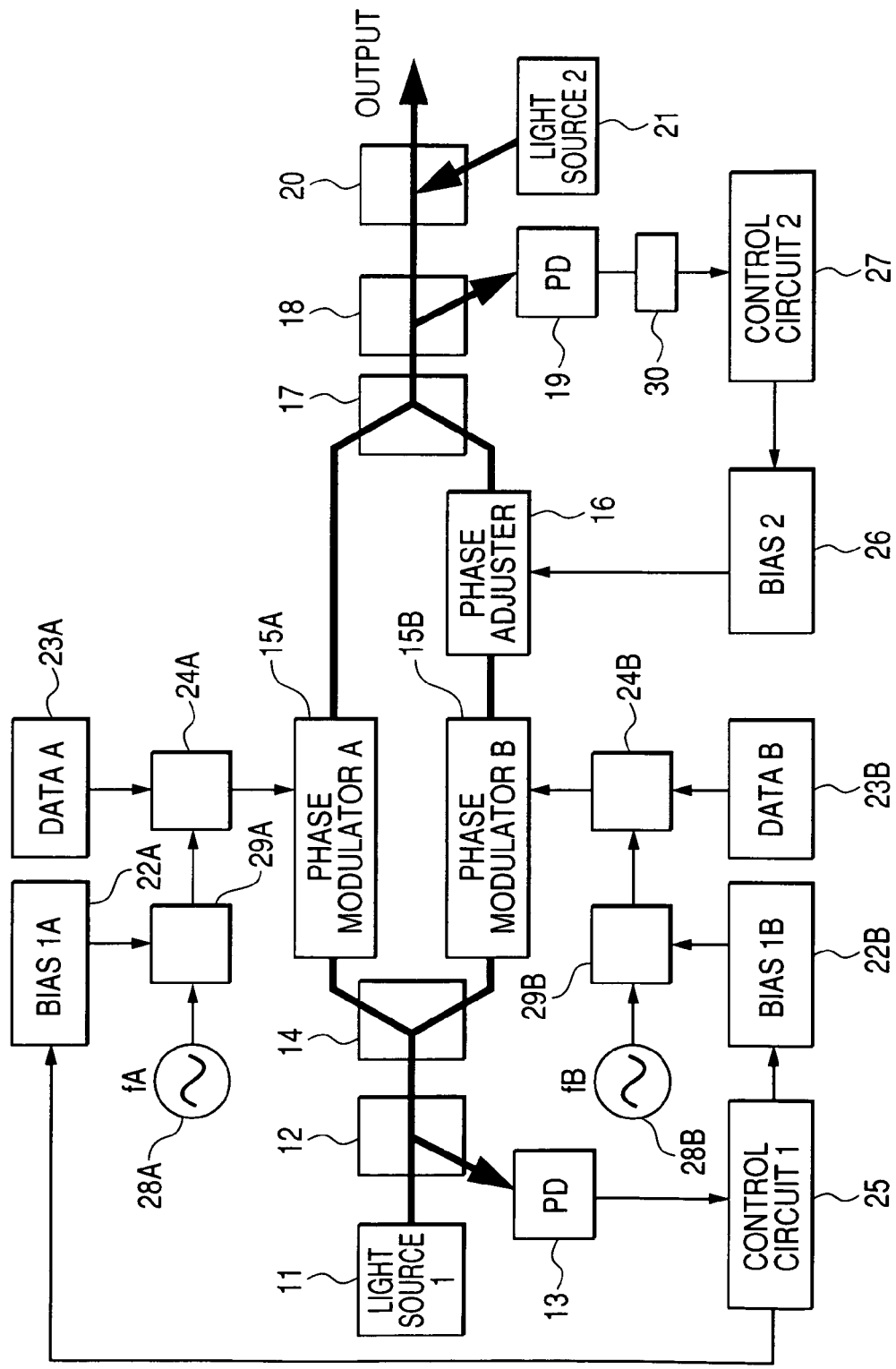
FIG. 28 shows the third and fourth embodiments.

A third embodiment of the present invention will now be described referring to FIG. 28 and FIG. 20. In FIG. 28, in addition to the composition of FIG. 8, a circuit (29A) which superposes a low-speed frequency fA (28A) on the bias 1A, and a circuit (29B) which superposes a low-speed frequency fB (28B) on the bias 1B are provided, and the electrical bandpass filter (30) is also added to the output of the photodiode (19).

Control 1 in FIG. 28 is the same as that of the first embodiment. In Control 2 of FIG. 26, a sum (fA+fB) or a difference (fA−fB) of two low frequency signals is extracted by the electrical bandpass filter (30) installed in the output of the photodiode (19), and the bias 2 (26) of the phase adjuster (16) is controlled so that the absolute value is a minimum, or does not exceed a predetermined specific value. Thus, by performing control using synchronous wave detection, Control 2 may be performed with higher precision.

Figure 20:
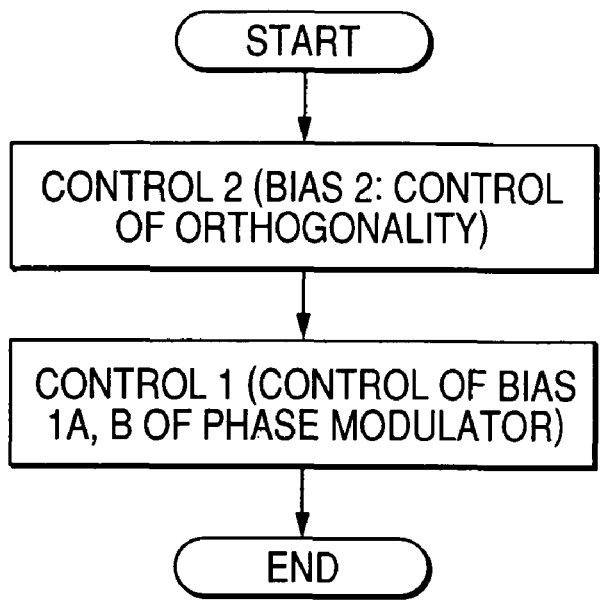
FIG. 20 shows a control process in the first, third and fifth embodiments.

In FIG. 28, the phase adjuster (16) and the two phase modulators (15A, 15B) of the quaternary phase modulator shown in FIG. 28 can be stably controlled by performing control according to the flowchart of FIG. 20. Specifically, Control 2 (bias control of the phase adjuster, i.e., control of orthogonality) is performed before Control 1 (bias control of the phase modulator), and the bias of each phase modulator is controlled while maintaining orthogonality. Hence, the phase adjuster and phase modulators can be controlled without being affected by the other phase modulator and phase adjuster.

Fourth Embodiment

A fourth embodiment of the present invention will now be described referring to FIG. 28 and FIG. 27. In FIG. 28, the phase adjuster (16) and the two phase modulators (15A, 15B) of the quaternary phase modulator shown in FIG. 28 can be stably controlled by performing control according to the flowchart of FIG. 27. Specifically, by independently performing Control 1 (control of the bias of the phase modulator) with a time constant t1, and control 2 (control of the bias of the phase adjuster, i.e., control of orthogonality) with a time constant t2, respectively, by making the time constant t2 of control 2 shorter than the time constant t1 of control 1, and by performing control 2 at a higher speed, the bias of each phase modulator is controlled giving priority to orthogonality control. Hence, the phase adjuster and phase modulators can be controlled without being affected by the other phase modulator and phase adjuster.

Fifth Embodiment

Figure 29:
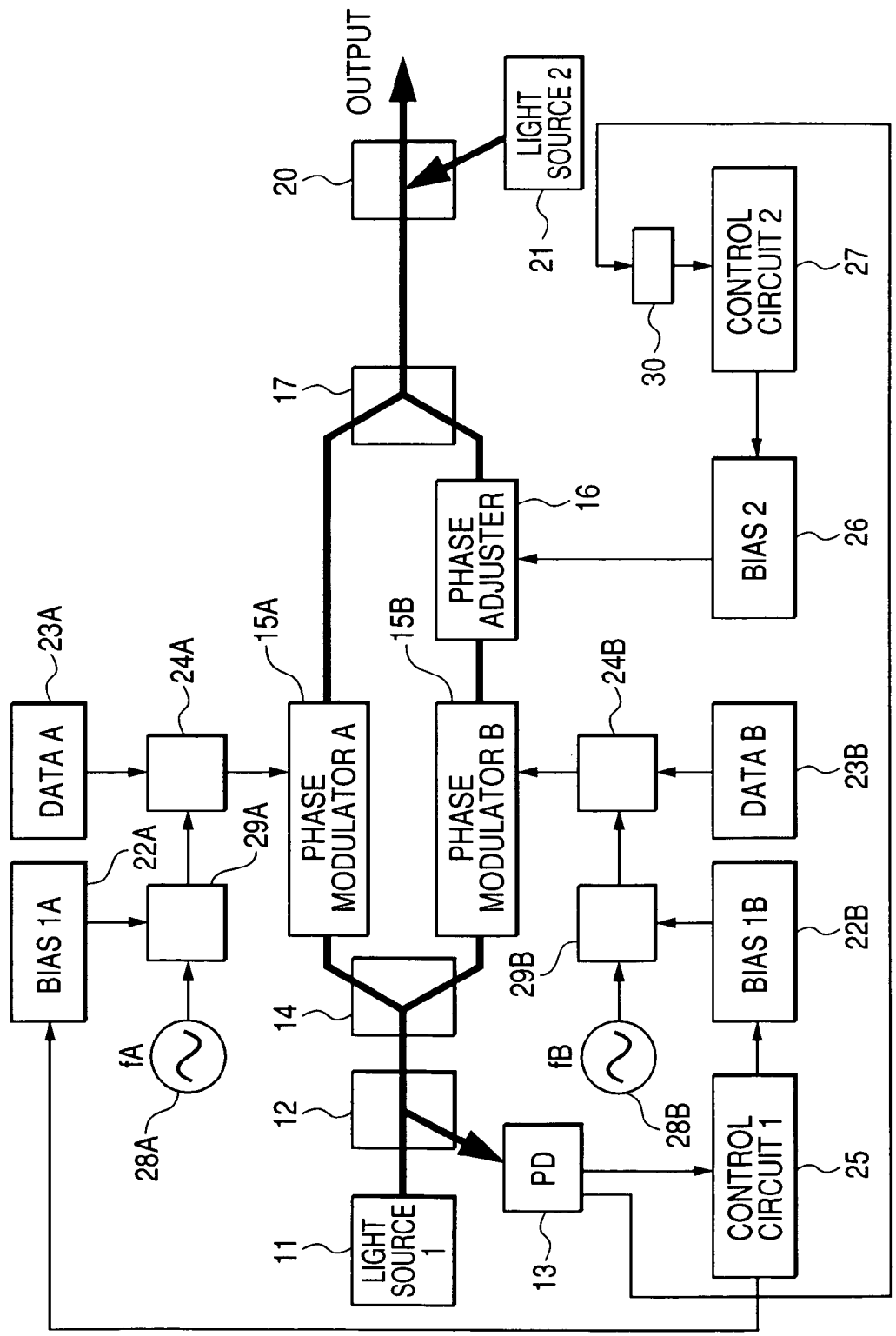
FIG. 29 shows the fifth and sixth embodiments.

A fifth embodiment of the present invention will now be described referring to FIG. 29 and FIG. 20. In FIG. 29, the photodiode (19) in FIG. 28 is omitted, one more output is taken from the photodiode (13) instead, and this is inputted into the bandpass filter (30). Control 1 is the same as that of Examples 1 and 3. In Control 2, a sum (fA+fB) or a difference (fA−fB)) of two low frequency signals is extracted by an electrical bandpass filter (30) installed in the output of the photodiode (13), and the bias 2 (26) of the phase adjuster (16) is controlled so that the absolute value is a minimum, or does not exceed a predetermined specific value. Thus, by performing control using synchronous wave detection, Control 2 may be performed with higher precision.

In FIG. 29, by performing control according to the flowchart shown in FIG. 20, the phase adjuster (16) and the two phase modulators (15A, 15B) of the quaternary phase modulator shown in FIG. 29, can be stably controlled. Specifically, Control 2 (bias control of the phase adjuster, i.e., control of orthogonality) is performed before Control 1 (bias control of the phase modulator), and the bias of each phase modulator is controlled while maintaining orthogonality. Hence, the phase adjuster and phase modulators can be controlled without being affected by the other phase modulator and phase adjuster.

Sixth Embodiment

A sixth embodiment of the present invention will now be described referring FIG. 29 and FIG. 27. In FIG. 29, the phase adjuster (16) and the two phase modulators (15A, 15B) of the quaternary phase modulator shown in FIG. 29, can be stably controlled by performing control according to the flowchart of FIG. 27. Specifically, by independently performing Control 1 (control of the bias of the phase modulator) with a time constant t1, and Control 2 (control of the bias of the phase adjuster, i.e., control of orthogonality) with a time constant t2, respectively, by making the time constant t2 of Control 2 shorter than the time constant t1 of Control 1, and by performing Control 2 at a higher speed, the bias of each phase modulator is controlled giving priority to orthogonality control. Hence, the phase adjuster and phase modulators can be controlled without being affected by the other phase modulator and phase adjuster.

What is claimed is:

1. A quaternary phase modulator, comprising:
   an optical branching filter that splits light from a first light source into two parts, and outputs the resulting lights;
   first and second phase modulators that modulate the phases of the two lights outputted from the branching filter, respectively, and output the resulting lights;
   a phase adjuster that shifts the phase of the light outputted from the first phase modulator, and outputs the resulting light;
   an optical multiplexer that multiplexes the outputted light of the phase adjuster and the outputted light of the second phase modulator, and outputs the resulting light;
   a second light source that outputs a backward light propagated in an opposite direction from that of the light outputted from the first light source;
   an optical coupler that introduces the backward light outputted from the second light source into an output end of the multiplexer;
   a first controller that performs feedback control of a bias voltage of a modulating electrical signal applied to the first and second phase modulators so that a light intensity monitor result of the backward light at an input end of the optical branching filter is a minimum value, or does not exceed a first predetermined value; and
   a second controller that performs feedback control of the voltage applied to the phase adjuster, so that the result of monitoring the outputted light of the optical multiplexer by a photodiode having a frequency response characteristic not exceeding the communication bit rate is a minimum value, or does not exceed a second predetermined value,
   wherein the quaternary phase modulator performs feedback control in the first controller after performing feedback control in the second controller.

2. The quaternary phase modulator according to claim 1, wherein, instead of the second light source and optical coupler, means is provided that splits part of the outputted light from the first light source, and performs loopback from the output end of the optical multiplexer.

3. The quaternary phase modulator according to claim 1, wherein the modulator uses the spontaneous emission light from an erbium doped fiber amplifier as the second light source.

4. The quaternary phase modulator according to claim 1, wherein the modulator uses an LED as the second light source.

5. The quaternary phase modulator according to claim 1, wherein instead of the second light source, means is provided that reflects part of the outputted light from the optical multiplexer, and performs loop-back.

6. A quaternary phase modulator, comprising:
   an optical branching filter that splits light from a first light source into two parts, and outputs the resulting lights;
   first and second phase modulators that modulate the phases of the two lights outputted from the branching filter, respectively, and output the resulting lights;
   a phase adjuster that shifts the phase of the light outputted from the first phase and outputs the resulting light;
   an optical multiplexer that multiplexes the outputted light of the phase adjuster and the outputted light of the second phase modulator, and outputs the resulting light;
   a second light source that outputs a backward light propagated in an opposite direction from that of the light outputted from the first light source;
   an optical coupler that introduces the backward light outputted from the second light source into an output end of the multiplexer;
   a first controller that performs feedback control of a bias voltage of a modulating electrical signal applied to the first and second phase modulators so that a light intensity monitor result of the backward light at an input end of the optical branching filter is a minimum value, or does not exceed a first predetermined value; and
   a second controller that performs feedback control of the voltage applied to the phase adjuster, so that the result of monitoring the outputted light of the optical multiplexer by a photodiode having a frequency response characteristic not exceeding the communication bit rate is a minimum value, or does not exceed a second predetermined value,
   wherein a control time constant of the feedback control in the second controller being less than a control time constant of the feedback control in the first controller.

7. A quaternary phase modulator, comprising:
   an optical branching filter that splits light from a first light source into two parts, and outputs the resulting light;
   first and second phase modulators that modulate the phases of the two lights outputted from the branching filter, respectively, and output the resulting lights;
   a phase adjuster that shifts the phase of the light outputted from the first phase modulator, and outputs the resulting light;
   an optical multiplexer that multiplexes the outputted light of the phase adjuster and the outputted light of the second phase modulator, and outputs the resulting light;
   a second light source that outputs a backward light propagated in an opposite direction from that of the light outputted from the first light source;
   an optical coupler that introduces the backward light outputted from the second light source into an output end of the multiplexer;
   first controller that performs feedback control of a bias voltage of a modulating electrical signal applied to the first and second phase modulators so that a light intensity monitor result of the backward light at an input end of the optical branching filter is a minimum value, or does not exceed a first predetermined value, first and second low frequency signals being respectively superposed on the modulating electrical signal applied to the first and second phase modulators, and the electrical signal obtained by photoelectrical conversion of the outputted light of the optical multiplexer being filtered at the frequency of the sum or difference of the first and second low frequency signals; and
   second controller that performs feedback control of the voltage applied to the phase adjuster so that the absolute value of the intensity of this filtered electrical signal is a minimum value, or does not exceed a second predetermined value, wherein the quaternary phase modulator performs feedback control in the first controller after performing feedback control in the second controller.

8. A quaternary phase modulator, comprising:

an optical branching filter that splits light from a first light source into two parts, and outputs the resulting light;

first and second phase modulators that modulate the phases of the two lights outputted from the branching filter, respectively, and output the resulting lights;

a phase adjuster that shifts the phase of the light outputted from the first phase modulator, and outputs the resulting light;

an optical multiplexer that multiplexes the outputted light of the phase adjuster and the outputted light of the second phase modulator, and outputs the resulting light;

a second light source that outputs a backward light propagated in an opposite direction from that of the light outputted from the first light source;

an optical coupler that introduces the backward light outputted from the second light source into an output end of the multiplexer;

a first controller that performs feedback control of a bias voltage of a modulating electrical signal applied to the first and second phase modulators so that a light intensity monitor result of the backward light at an input end of the optical branching filter is a minimum value, or does not exceed a first predetermined value, first and second low frequency signals being respectively superposed on the modulating electrical signal applied to the first and second phase modulators, and the electrical signal obtained by photoelectrical conversion of the outputted light of the optical multiplexer being filtered at the frequency of the sum or difference of the first and second low frequency signals; and a second controller that performs feedback control of the voltage applied to the phase adjuster so that the absolute value of the intensity of this filtered electrical signal is a minimum value, or does not exceed a second predetermined value, wherein a control time constant of the first feedback control means is less than a control time constant of the second controller.

9. A quaternary phase modulator, comprising:

an optical branching filter that splits light from a first light source into two parts, and outputs the resulting light;

first and second phase modulators that modulate the phases of the two lights outputted from the branching filter, respectively, and output the resulting lights;

a phase adjuster that shifts the phase of the light outputted from the first phase modulator, and outputs the resulting light;

an optical multiplexer that multiplexes the outputted light of the phase adjuster and the outputted light of the second phase modulator, and outputs the resulting light;

a second light source that outputs a backward light propagated in an opposite direction from that of the light outputted from the first light source;

an optical coupler that introduces the backward light outputted from the second light source into an output end of the multiplexer;

a first controller that performs feedback control of a bias voltage of a modulating electrical signal applied to the first and second phase modulators so that a light-intensity monitor result of the backward light at an input end of the optical branching filter is a minimum value, or does not exceed a first predetermined value, first and second low frequency signals being respectively superposed on the modulating electrical signals applied to the first and second phase modulators, and the electrical signal obtained by photoelectrical conversion of the backward light at the input end of the optical branching filter being filtered at the frequency of the sum or difference of the first and second low frequency signals; and a second controller that performs feedback control of the voltage applied to the phase adjuster so that the absolute value of the intensity of this filtered electrical signal is a minimum value, or does not exceed a second predetermined value, wherein the quaternary phase modulator performs feedback control in the first controller after performing feedback control in the second controller.

10. A quaternary phase modulator, comprising:

an optical branching filter that splits light from a first light source into two parts, and outputs the resulting light;

first and second phase modulators that modulate the phases of the two lights outputted from the branching filter, respectively, and output the resulting lights;

a phase adjuster that shifts the phase of the light outputted from the first phase modulator, and outputs the resulting light;

an optical multiplexer that multiplexes the outputted light of the phase adjuster and the outputted light of the second phase modulator, and outputs the resulting light;

a second light source that outputs the backward light propagated in an opposite direction from that of the light outputted from the first light source;

an optical coupler that introduces the backward light outputted from the second light source into an output end of the multiplexer;

a first controller that performs feedback control of a bias voltage of a modulating electrical signal applied to the first and second phase modulators so that a light intensity monitor result of the backward light at an input end of the optical branching filter is a minimum value, or does not exceed a first predetermined value, first and second low frequency signals being respectively superposed on the modulating electrical signals applied to the first and second phase modulators, and the electrical signal obtained by photoelectrical conversion of the backward light at the input end of the optical branching filter being filtered at the frequency of the sum or difference of the first and second low frequency signals; and a second controller that performs feedback control of the voltage applied to the phase adjuster so that the absolute value of the intensity of this filtered electrical signal is a minimum value, or does not exceed a second predetermined value, wherein a control time constant of the first feedback control means is less than a control time constant of the second controller.

* * * * *